United States Patent
Osanai

(10) Patent No.: US 12,459,356 B2
(45) Date of Patent: Nov. 4, 2025

(54) VEHICLE, MOBILE DEVICE, AND CONTROL METHOD THEREFOR

(71) Applicant: HONDA MOTOR CO., LTD., Tokyo (JP)

(72) Inventor: Takuya Osanai, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 704 days.

(21) Appl. No.: 17/728,497

(22) Filed: Apr. 25, 2022

(65) Prior Publication Data

US 2022/0242242 A1  Aug. 4, 2022

Related U.S. Application Data

(63) Continuation of application No. PCT/JP2019/051582, filed on Dec. 27, 2019.

(51) Int. Cl.
*B60K 35/10* (2024.01)
*B60K 35/22* (2024.01)
(Continued)

(52) U.S. Cl.
CPC .............. *B60K 35/10* (2024.01); *B60K 35/22* (2024.01); *B60K 35/80* (2024.01); *B60K 35/26* (2024.01);
(Continued)

(58) Field of Classification Search
CPC ........ B60K 35/00; B60K 35/60; B60K 35/10; B60K 35/26; B60K 35/28; B60K 35/65; B60K 35/80
See application file for complete search history.

(56) References Cited

U.S. PATENT DOCUMENTS

| | | | | |
|---|---|---|---|---|
| 2014/0297674 A1* | 10/2014 | Rhee | ...................... | B60K 35/10 |
| | | | | 715/740 |
| 2016/0231977 A1* | 8/2016 | Yamada | ................. | B60K 35/00 |
| 2019/0250006 A1* | 8/2019 | Lu | ........................ | B60K 35/215 |

FOREIGN PATENT DOCUMENTS

| JP | 2007-164505 A | 6/2007 |
|---|---|---|
| JP | 2016-147657 A | 8/2016 |

(Continued)

OTHER PUBLICATIONS

International Search Report for PCT/JP2019/051582 mailed Mar. 17, 2020 with partial English Translation.
IPRP for PCT/JP2019/051582 mailed Oct. 6, 2020.

*Primary Examiner* — Cao H Nguyen
(74) *Attorney, Agent, or Firm* — Thomas Horstemeyer, LLP

(57) ABSTRACT

A mobile device to be in cooperation with a vehicle selects and performs one of cooperative functions, acquires upward, downward, leftward, and rightward instructions from the vehicle, generates a sound output toward a driver, and acquires a voice input from the driver. The plurality of cooperative functions are classified into a menu hierarchy, a target selection hierarchy, and an active hierarchy. The mobile device transitions from the menu hierarchy to the target selection hierarchy and from the target selection hierarchy to the active hierarchy in the cooperative functions, based on an instruction in one specific direction of the upward, downward, leftward, and rightward instructions, and transitions to a voice search in the target selection hierarchy, based on an instruction in the specific direction.

10 Claims, 16 Drawing Sheets

(51) Int. Cl.
*B60K 35/26* (2024.01)
*B60K 35/28* (2024.01)
*B60K 35/65* (2024.01)
*B60K 35/80* (2024.01)

(52) U.S. Cl.
CPC .............. *B60K 35/28* (2024.01); *B60K 35/65* (2024.01); *B60K 2360/115* (2024.01); *B60K 2360/148* (2024.01); *B60K 2360/166* (2024.01); *B60K 2360/563* (2024.01); *B60K 2360/573* (2024.01); *B60K 2360/741* (2024.01)

(56) References Cited

FOREIGN PATENT DOCUMENTS

| | | |
|---|---|---|
| JP | 2019-164118 A | 9/2019 |
| WO | 2021/131063 A1 | 7/2021 |

* cited by examiner

VEHICLE, MOBILE DEVICE, AND CONTROL METHOD THEREFOR

CROSS-REFERENCE TO RELATED APPLICATION(S)

This application is a continuation of International Patent Application No. PCT/JP2019/051582 filed on Dec. 27, 2019, the entire disclosures of which are incorporated herein by reference.

BACKGROUND OF THE INVENTION

Field of the Invention

The present invention relates to a vehicle, a mobile device, and a control method therefor.

Description of the Related Art

Japanese Patent Laid-Open No. 2019-164118 proposes a technique of displaying a navigation function being performed on a mobile device, on a display device of a vehicle. In addition, the vehicle of this document includes a physical button set that are an upward button and a downward button, and a user supplies the mobile device with an instruction by manually operating the physical button set.

SUMMARY OF THE INVENTION

Japanese Patent Laid-Open No. 2019-164118 does not disclose a specific method of using the physical button set for inputting an instruction to the mobile device. One aspect of the present invention provides a technique for enabling intuitively giving an instruction at a vehicle to a mobile device.

In an embodiment, a mobile device to be in cooperation with a vehicle includes a processing unit configured to select and perform one of a plurality of cooperative functions, a direction acquisition unit configured to acquire upward, downward, leftward, and rightward instructions from the vehicle, a generation unit configured to generate a sound output toward a driver of the vehicle, and a voice acquisition unit configured to acquire a voice input from the driver of the vehicle. The plurality of cooperative functions are classified into a menu hierarchy, a target selection hierarchy for selecting a target to be performed by the cooperative function that is being selected, and an active hierarchy for indicating a performed situation of the cooperative function that is being selected. The processing unit is configured to switch between the plurality of cooperative functions in the menu hierarchy based on an instruction in a first direction, the first direction being one of a horizontal direction and a vertical direction, perform a process of a cooperative function that is being selected in a hierarchy other than the menu hierarchy, based on the upward, downward, leftward, and rightward instructions, transition from the menu hierarchy to the target selection hierarchy and from the target selection hierarchy to the active hierarchy in the plurality of cooperative functions, based on an instruction in one specific direction of the upward, downward, leftward, and rightward instructions, and transition to a voice search in the target selection hierarchy, based on an instruction in the specific direction.

Further features of the present invention will become apparent from the following description of exemplary embodiments (with reference to the attached drawings).

DESCRIPTION OF THE EMBODIMENTS

Figure 1:
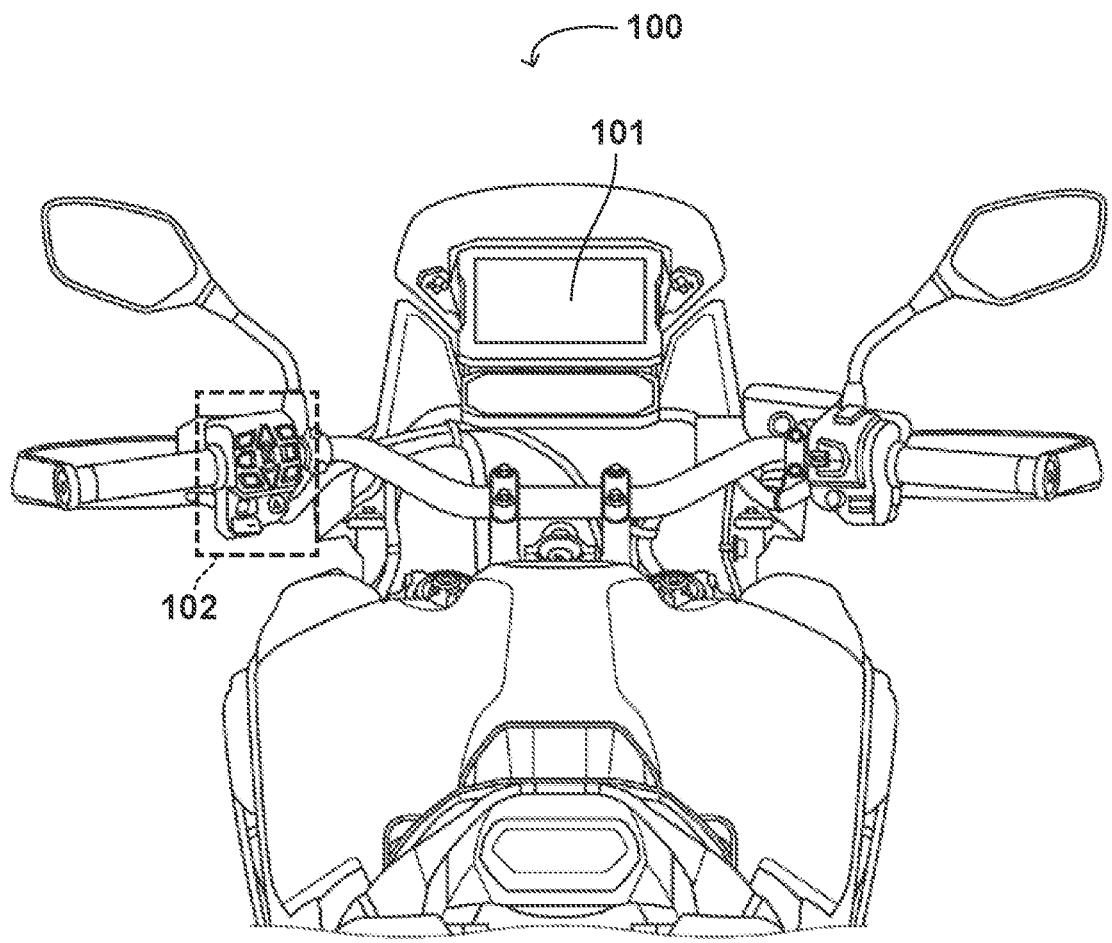
FIG. 1 is a diagram illustrating an external appearance on a front side of a vehicle in some embodiments.
Figure 1:
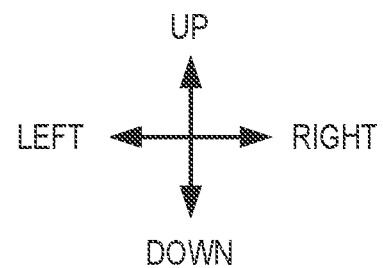

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

An appearance of a vehicle 100 in some embodiments will be described with reference to FIG. 1. The vehicle 100 is a straddle type motorcycle. Instead of this, the present invention is also applicable to other vehicles, for example, four-wheeled vehicles and three-wheeled vehicles. FIG. 1 is a rear view of a front side of the vehicle 100.

The vehicle 100 includes a display device 101 at the center in a vehicle width direction. The display device 101 displays information for a driver of the vehicle 100 (hereinafter, simply referred to as a driver). The display device 101 may be a dot matrix display device such as a liquid crystal display or an organic electro-luminescence (EL) display, or may be an aggregation of indicators for giving a notification by lighting off or lighting on (or blinking) a mark that has been defined beforehand.

Figure 2:
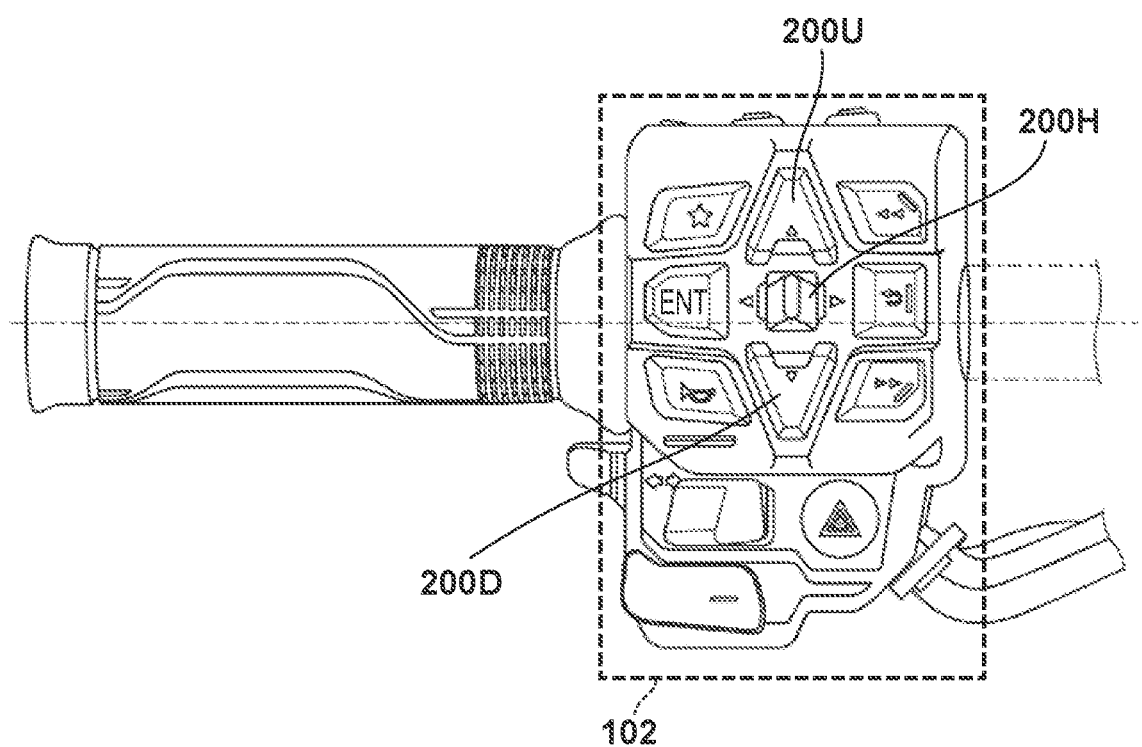
FIG. 2 is a diagram illustrating an appearance of a left-side switch group of the vehicle in some embodiments.
Figure 2:
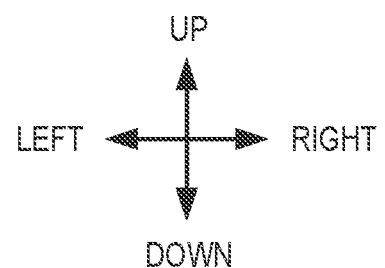

The vehicle 100 includes a left-side handlebar switch 102 on an inner side in the vehicle width direction of the left-side handlebar grip. The appearance of the left-side handlebar switch 102 will be described with reference to FIG. 2. The left-side handlebar switch 102 includes a plurality of switches. At least some of these plurality of switches are operable by the left thumb, while the driver holds the left-side handlebar with the left hand. Hereinafter, switches used for a cooperative function (to be described later) between the vehicle 100 and the mobile device will be described. The other switches (that is, the switches used for any functions of the vehicle 100 other than the cooperative function) of the left-side handlebar switch 102 may have the same configurations as those of the conventional ones. Thus, the descriptions for them will be omitted.

The left-side handlebar switch 102 includes an up switch 200U, a down switch 200D, and a horizontal switch 200H. The horizontal switch 200H is disposed substantially at the center of the left-side handlebar switch 102. The horizontal switch 200H is a tilting switch capable of tilting toward each of the left and right directions. The driver is able to input a leftward instruction by tilting the horizontal switch 200H to the left side, and is able to input a rightward instruction by tilting the horizontal switch 200H to the right side. The up switch 200U is disposed on an upper side of the horizontal switch 200H. The up switch 200U is a press type switch. The driver is able to input an upward instruction by pressing the up switch 200U. The down switch 200D is disposed on a lower side of the horizontal switch 200H. The down switch 200D is a press type switch. The driver is able to input a downward instruction by pressing the down switch 200D. The up switch 200U, the down switch 200D, and the horizontal switch 200H are collectively referred to as a direction switch 200. The direction switch 200 is not limited to the configuration of FIG. 2, and may have any configuration capable of inputting instructions in four directions.

Figure 3:
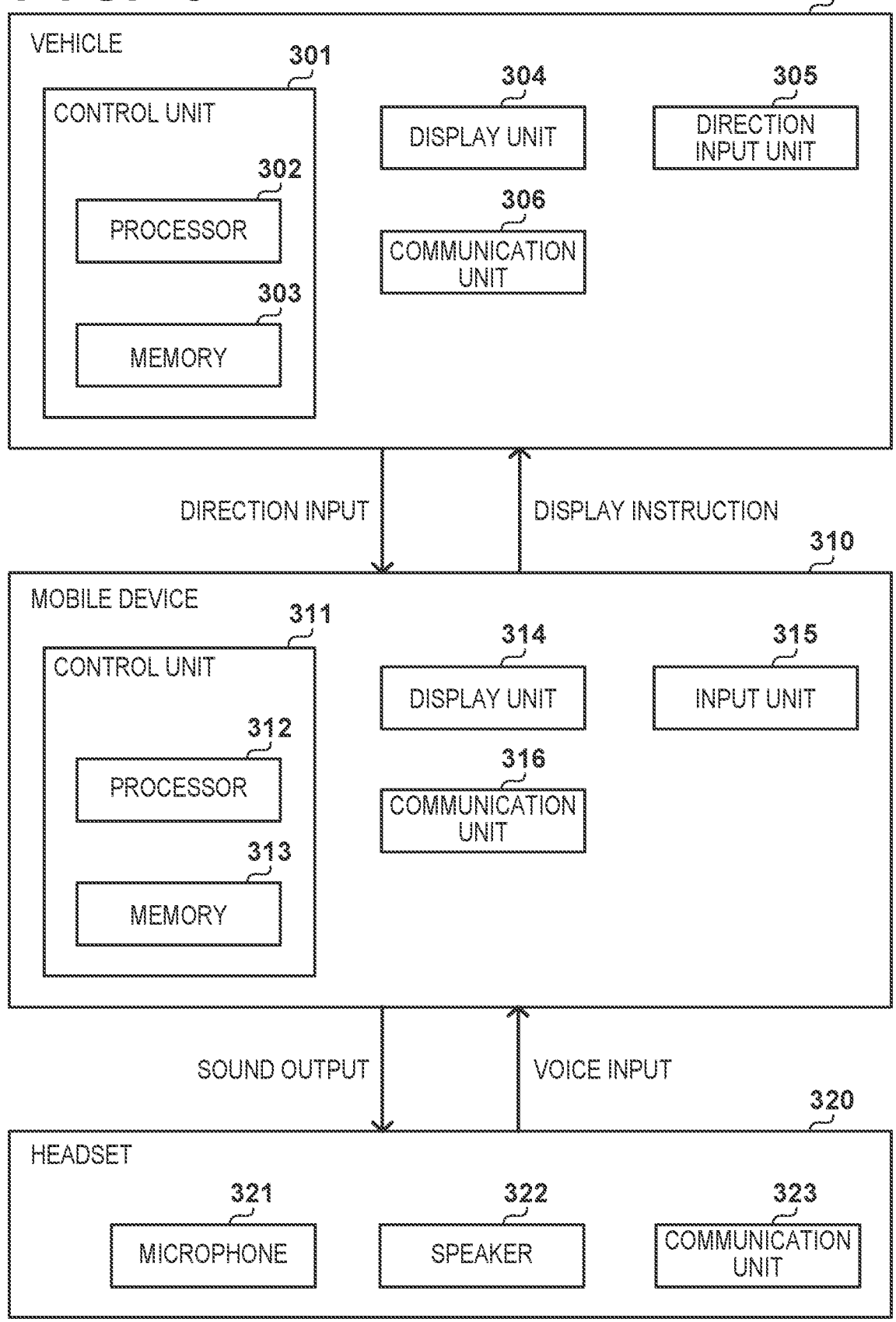
FIG. 3 is a functional block diagram of a cooperative system in some embodiments.

A functional configuration of a cooperative system that provides a cooperative function in some embodiments of the present invention will be described with reference to FIG. 3. The cooperative system includes the above-described vehicle 100, a mobile device 310, and a headset 320.

The vehicle 100 includes a control unit 301, a display unit 304, a direction input unit 305, and a communication unit 306. The control unit 301 controls the entirety of the vehicle 100. The control unit 301 is configured with, for example, a processor 302 and a memory 303. In this case, the operation by the control unit 301 is implemented by the processor 302 executing a program stored in the memory 303. Some or all of the operations of the control unit 301 may be implemented by a dedicated circuit such as an application specific integrated circuit (ASIC) or a field programmable gate array (FPGA).

The display unit 304 displays information for the driver. The display unit 304 is achieved by, for example, the display device 101. The direction input unit 305 acquires instructions in four directions from the driver. The direction input unit 305 is achieved by, for example, the up switch 200U, the down switch 200D, and the horizontal switch 200H. The communication unit 306 provides a function for the vehicle 100 to communicate with the outside. The communication unit 306 may support short-range wireless communication such as Bluetooth (registered trademark). Furthermore, the communication unit 306 may support cellular communication, road-to-vehicle communication, and the like.

The direction input unit 305 may receive two stages of inputs for each direction using the direction switch 200. For example, the direction input unit 305 may receive a short press input (for example, an input with duration shorter than one second) and a long press input (for example, an input with duration equal to or longer than one second). Instead of this, the direction input unit 305 may receive a single tap input (for example, an input with an interval equal to or longer than one second up to a subsequent input) and a double tap input (for example, two consecutive inputs with an interval shorter than one second).

The mobile device 310 includes a control unit 311, a display unit 314, an input unit 315, and a communication unit 316. The mobile device 310 may be, for example, a mobile telephone device such as a smartphone. The user of the mobile device 310 may be the same person with the driver. Hereinafter, a case where the driver uses the mobile device 310 will be described. The mobile device 310 may be held by a driver, or may be accommodated in the vehicle 100. The control unit 311 controls the entirety of the mobile device 310. The control unit 311 is configured with, for example, a processor 312 and a memory 313. In this case, the operation by the control unit 311 is implemented by the processor 312 executing a program stored in the memory 313. The program may include an operating system and an application. Some or all of the operations of the control unit 311 may be implemented by a dedicated circuit such as an ASIC or an FPGA.

The display unit 314 displays information for the driver. The display unit 314 is achieved by, for example, a display device such as a liquid crystal display or an organic EL display. The input unit 315 acquires an input from the driver. The input unit 315 is achieved by an input device such as a touch panel or a button. The communication unit 316 provides a function for the mobile device 310 to communicate with the outside. The communication unit 316 may support short-range wireless communication such as Bluetooth. Furthermore, the communication unit 306 may support cellular communication, WiFi (registered trademark) communication, and the like.

The headset 320 includes a microphone 321, a speaker 322, and a communication unit 323. The headset 320 is mounted on the head of the driver. The microphone 321 acquires a voice input from the driver. The speaker 322 outputs sound toward the driver. The communication unit 323 may support short-range wireless communication such as Bluetooth.

In some embodiments of the present invention, the vehicle 100 and the mobile device 310 cooperate with each other. Specifically, a communication link is established between the vehicle 100 and the mobile device 310, for example, by the short-range wireless communication. The vehicle 100 and the mobile device 310 exchange data through such a communication link. In addition, a communication link is established between the mobile device 310 and the headset 320, for example, by the short-range wireless communication. The mobile device 310 and the headset 320 exchange data through such a communication link.

At least some of the plurality of functions provided by the mobile device 310 are capable of cooperating with the vehicle 100. Hereinafter, among the functions provided by the mobile device 310, a function capable of cooperating with the vehicle 100 will be referred to as a cooperative function. The driver inputs a direction into the mobile device 310 via the direction input unit 305 of the vehicle 100. This direction input is transmitted from the vehicle 100 to the mobile device 310. The mobile device 310 performs an operation of the cooperative function in accordance with the direction input from the driver, and generates an image indicating an operating situation. The mobile device 310 transmits the image that has been generated to the vehicle 100. The vehicle 100 displays, on the display unit 304, the image that has been received.

Further, the mobile device 310 transmits, to the headset 320, the sound output toward the driver. The headset 320 outputs, from the speaker 322, the sound output that has been received. The headset 320 transmits, to the mobile device 310, a voice input that has been acquired by the microphone 321 from the driver. The mobile device 310 performs a cooperative function in accordance with the voice input from the driver.

Figure 4:
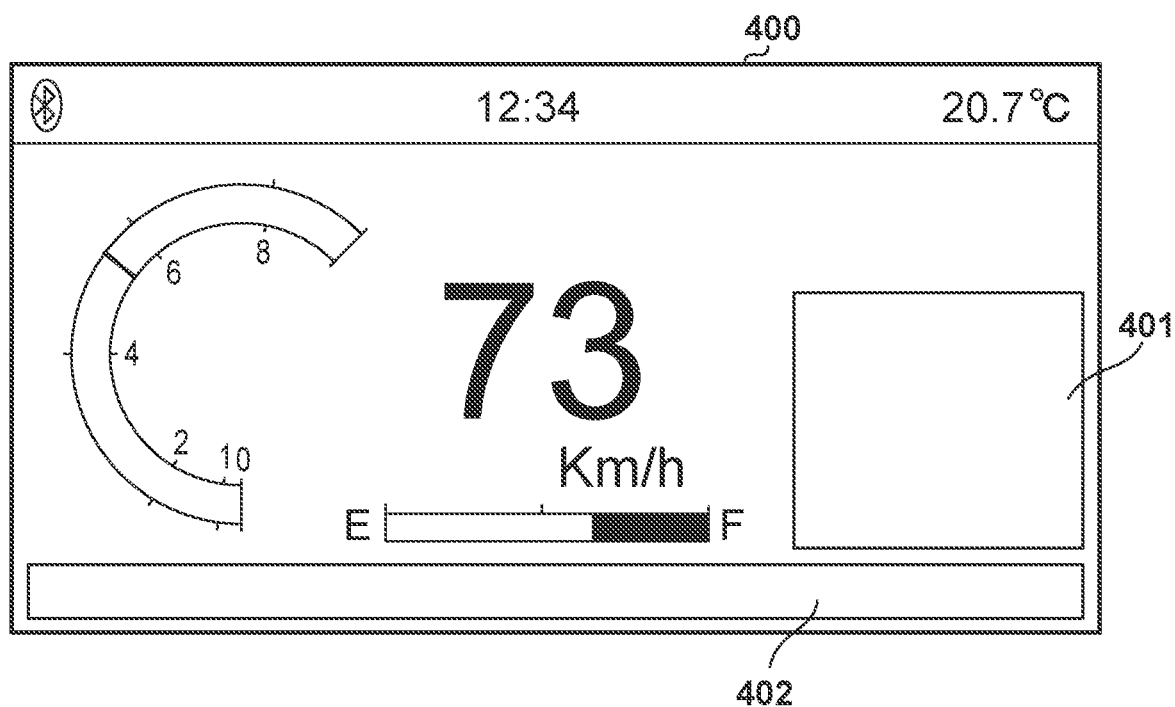
FIG. 4 is a diagram illustrating a display on a vehicle in some embodiments.
Figure 5:
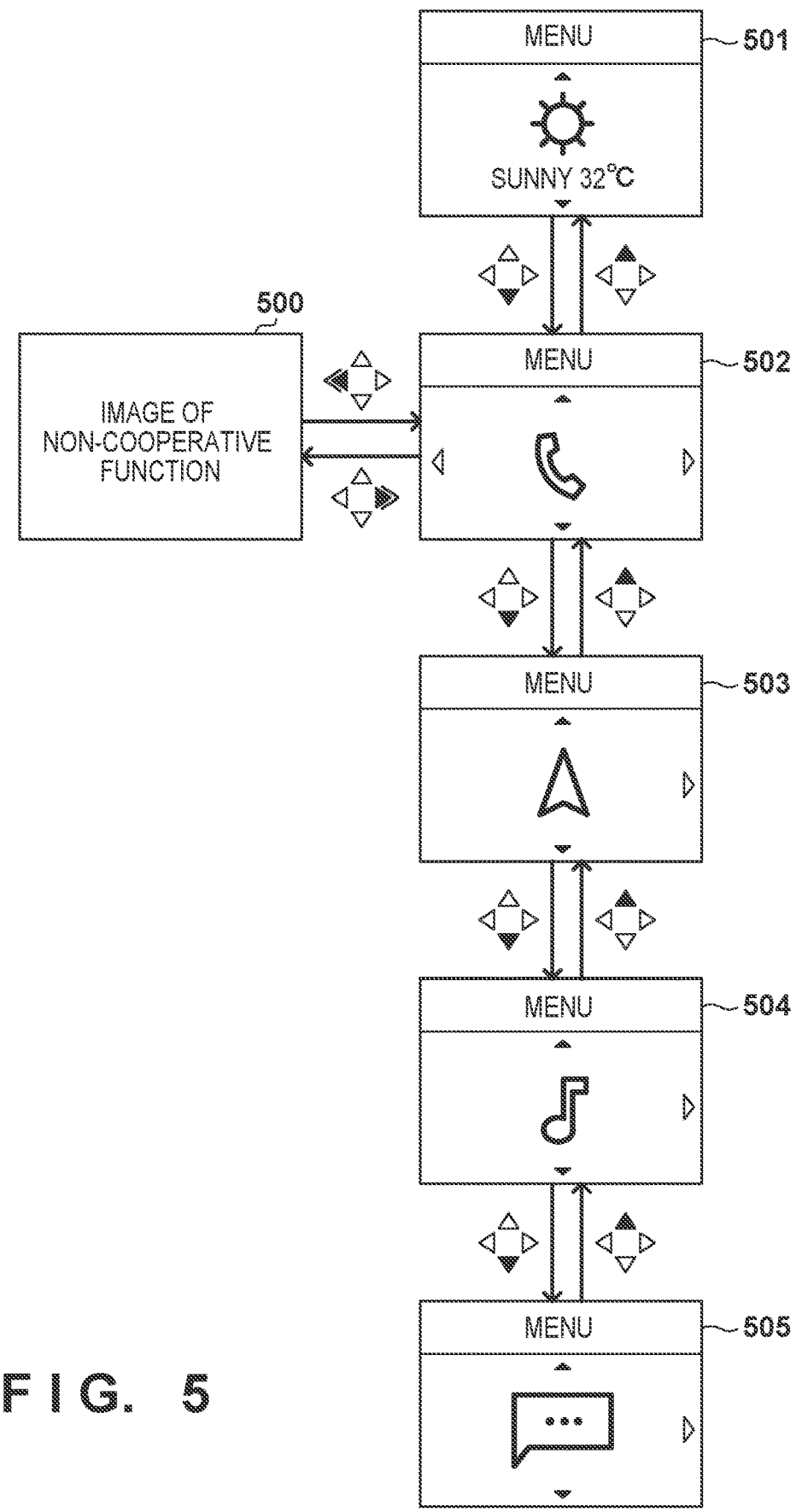
FIG. 5 is a diagram illustrating a menu display screen of a cooperative function in some embodiments.

A description will be given with regard to an embodiment (hereinafter, referred to as a first embodiment) in a case where the display device 101 is a dot matrix type. In FIG. 4, a description will be given with regard to a display example of the display unit 304 in a cooperative operation between the vehicle 100 and the mobile device 310. A screen 400 is an example of a screen displayed on the display device 101. The traveling speed is displayed at the center of the screen 400, and the remaining fuel amount is displayed on its lower side. A tachometer is displayed on a left side of the screen 400.

An area 401 on a right side of the screen 400 is an area for displaying an image supplied from the mobile device 310, while the vehicle 100 is in cooperation with the mobile device 310. Hereinafter, such an image will be referred to as a cooperative image. While the cooperative image is not supplied from the mobile device 310 (that is, while the vehicle 100 is not in cooperation with the mobile device 310), the vehicle 100 may display another image in the area 401, for example, an image that is not related to the cooperative function. For example, the vehicle 100 may display, in the area 401, an option image such as a riding mode parameter (for example, information set in the vehicle 100, such as an operating situation of an antilock brake system (ABS)) and a level adjustment. In the area 401, an image of low importance among images that are not related to the cooperative function (for example, an image related to traveling of the vehicle 100) may be displayed. The area 401 is shared between the image of low importance that is not related to the cooperative function and the cooperative image, so that the space of the screen 400 can be effectively utilized.

An area 402 on a lower side of the screen 400 is an area for displaying an image supplied from the mobile device 310, in a state in which the vehicle 100 is not in cooperation with the mobile device 310. Hereinafter, such an image is referred to as an interruption image. While no interruption image is supplied from the mobile device 310, the vehicle 100 may display another image, for example, an image that is not related to the cooperative function, in the area 402.

A specific operation example of the cooperative function will be described with reference to FIGS. 5 to 9. The mobile device 310 provides a plurality of cooperative functions. The plurality of cooperative functions may include two or more of a weather information providing function, a call communication function, a messaging function, a music reproducing function, and a route guidance function. Hereinafter, a case where the mobile device 310 provides all of the above five cooperative functions will be described. The weather information providing function is a function of providing weather information of a specific place. The weather may include at least one of sky conditions and temperature. The call communication function is a function of conducting call communication with another person. The messaging function is a function of exchanging a text message with another person. The music reproducing function is a function of reproducing music. The route guidance function is a function of guiding a route to a designated destination.

The mobile device 310 receives two types of inputs for each of four directions (upward, downward, leftward, and rightward) from the vehicle 100. In the following example, a case where two types of inputs are a short press and a long press will be given. In FIGS. 5 to 9, a black triangle indicates the short press, and a black triangle applied with "A" indicates the long press. In FIGS. 5 to 9, all images other than an image 500 are cooperative images, that is, images that are transmitted from the mobile device 310 to the vehicle 100 and displayed on the display device 101 of the vehicle 100, while the cooperative function is being performed. Therefore, in the following description of FIGS. 5 to 9, the description up to the transmission of the cooperative image will be given, but the description of the subsequent display of the cooperative image will be omitted.

While the vehicle 100 and the mobile device 310 are not in cooperation (that is, while the mobile device 310 is not performing any cooperative function), the image 500 other than the cooperative function is displayed in the area 401 of the screen 400. In a state of not cooperating with the vehicle 100, when acquiring a leftward long press input from the driver via the direction input unit 305 of the vehicle 100, the mobile device 310 starts cooperation with the vehicle 100. Similarly in the following description, the direction input is acquired from the driver via the direction input unit 305 of the vehicle 100, and thus only the input direction (upward, downward, leftward, and rightward) and the input mode (short press/long press) are indicated.

Each of the plurality of cooperative functions includes a top image. The top image is an image transmitted from the mobile device 310 to the vehicle 100 for one cooperative function immediately after such one cooperative function is selected. An image 501 is a top image of the weather information providing function. In the image 501, an image indicating the weather at the current location of the vehicle 100 and the temperature at the current location are displayed. When a destination is set in the vehicle 100, an image indicating the weather at the destination and the temperature at the destination may be displayed in the image 501. An image 502 is a top image of the call communication function. The image 502 includes an image indicating the call communication function. An image 503 is a top image of the route guidance function. The image 503 includes an image indicating the route guidance function. An image 504 is a top image of the music reproducing function. The image 504 includes an image indicating the music reproducing function. An image 505 is a top image of the messaging function. The image 505 includes an image indicating the messaging function.

When the cooperation is started, the mobile device 310 selects any one of the plurality of cooperative functions, and transmits the top image of the cooperative function that has been selected. The cooperative function selected here may be a cooperative function that has been set beforehand as an initial function. Such a cooperative function will be referred to as an initial cooperative function. In the following description, it is assumed that the call communication function is set as the initial cooperative function. Therefore, the mobile device 310 transmits the image 502 immediately after the cooperation is started. The driver is also able to set another cooperative function as the initial cooperative function. The mobile device 310 may notify by sound that the cooperation has been started.

In a state in which the top image (in this example, the image 502) of the initial cooperative function is displayed, when acquiring a rightward long press input, the mobile device 310 ends the cooperation with the vehicle 100. In this case, the mobile device 310 transmits a notification of ending the cooperation to the vehicle 100, and the vehicle 100 ends the cooperative operation, based on the notification, and displays the image 500 other than the cooperative function in the area 401. The mobile device 310 may notify by sound that the cooperation has ended.

As described above, the cooperative image is displayed in the area 401 on the right side of the screen 400. Therefore, when the cooperative image is displayed in the area 401 at the start of the cooperation, the driver feels as if the cooperative image entered the area 401 across a right end of the screen 400 from the outside of the screen 400. The input direction (leftward) for starting the cooperative operation is coincident with such a virtual moving direction of the cooperative image. Thus, the driver is able to intuitively start the cooperative function. In order to make this effect more remarkable, the vehicle 100 may display an animation in which the cooperative image enters the area 401 from the right side. In addition, when the cooperative image in the area 401 disappears at the end of the cooperation, the driver feels as if the cooperative image moved across the right end of the screen 400 to the outside of the screen 400. The input direction (rightward) for ending the cooperative operation is coincident with such a virtual moving direction of the cooperative image. Thus, the driver is able to intuitively end the cooperative function. In order to make this effect more remarkable, the vehicle 100 may display an animation in which the cooperative image moves out to the right side from the area 401. Furthermore, the vehicle 100 may associate the input direction with the moving direction of the image also in the display of another cooperative image. That is, the vehicle 100 may display the image that has been received as a response to transmitting the upward, downward, leftward, and downward instructions to the mobile device 310, as an animation of moving in the direction of the instruction.

Next, switching between the plurality of cooperative functions will be described. In a state in which any top image (any of the images 501 to 505) of the plurality of cooperative functions is displayed, when acquiring an upward short press input or a downward short press input, the mobile device 310 switches the cooperative function that is being selected to another cooperative function, and transmits the top image of the cooperative function after the switching. For example, in a state in which the top image of the cooperative function that is being selected is displayed, when acquiring a downward short press input, the mobile device 310 switches the cooperative function that is being selected in the order of the weather information providing function, the call communication function, the route guidance function, the music reproducing function, and the messaging function, and transmits the top image (any one of the images 501 to 505) corresponding to the cooperative function after the switching. In addition, in response to acquisition of the upward short press input in a state in which the top image of the cooperative function that is being selected is displayed, the mobile device 310 switches the cooperative function that is being selected in the reverse order, and transmits the top image (any one of the images 501 to 505) corresponding to the cooperative function after the switching. Although not illustrated, direct switching from the weather information providing function to the messaging function and switching in the reverse order may be enabled. The mobile device 310 may notify by sound the cooperative function after the switching together with the switching of the cooperative function.

Even while any of the cooperative images illustrated in FIGS. 5 to 9 is displayed, when acquiring a leftward long press input, the mobile device 310 transitions to transmission of the top image of the initial cooperative function (in this example, the image 502). Even while any of the cooperative images illustrated in FIGS. 5 to 9 is displayed, when acquiring a downward long press input, the mobile device 310 sets the volume of the sound to be output to the driver to 0 (that is, mutes the sound). On the other hand, when acquiring a downward long press input in a mute state, the mobile device 310 cancels the mute state, and returns the volume to the sound volume before muting. Even while any of the cooperative images illustrated in FIGS. 5 to 9 is displayed, when acquiring a rightward long press input, the mobile device 310 may end the cooperative operation. Instead of this, the mobile device 310 may receive an end instruction of the cooperative operation only in a state in which the top image of the initial cooperative function (in this example, the image 502) is displayed, or may receive the end instruction of the cooperative operation only in a state in which the top image of any of the cooperative functions is displayed.

Figure 6:
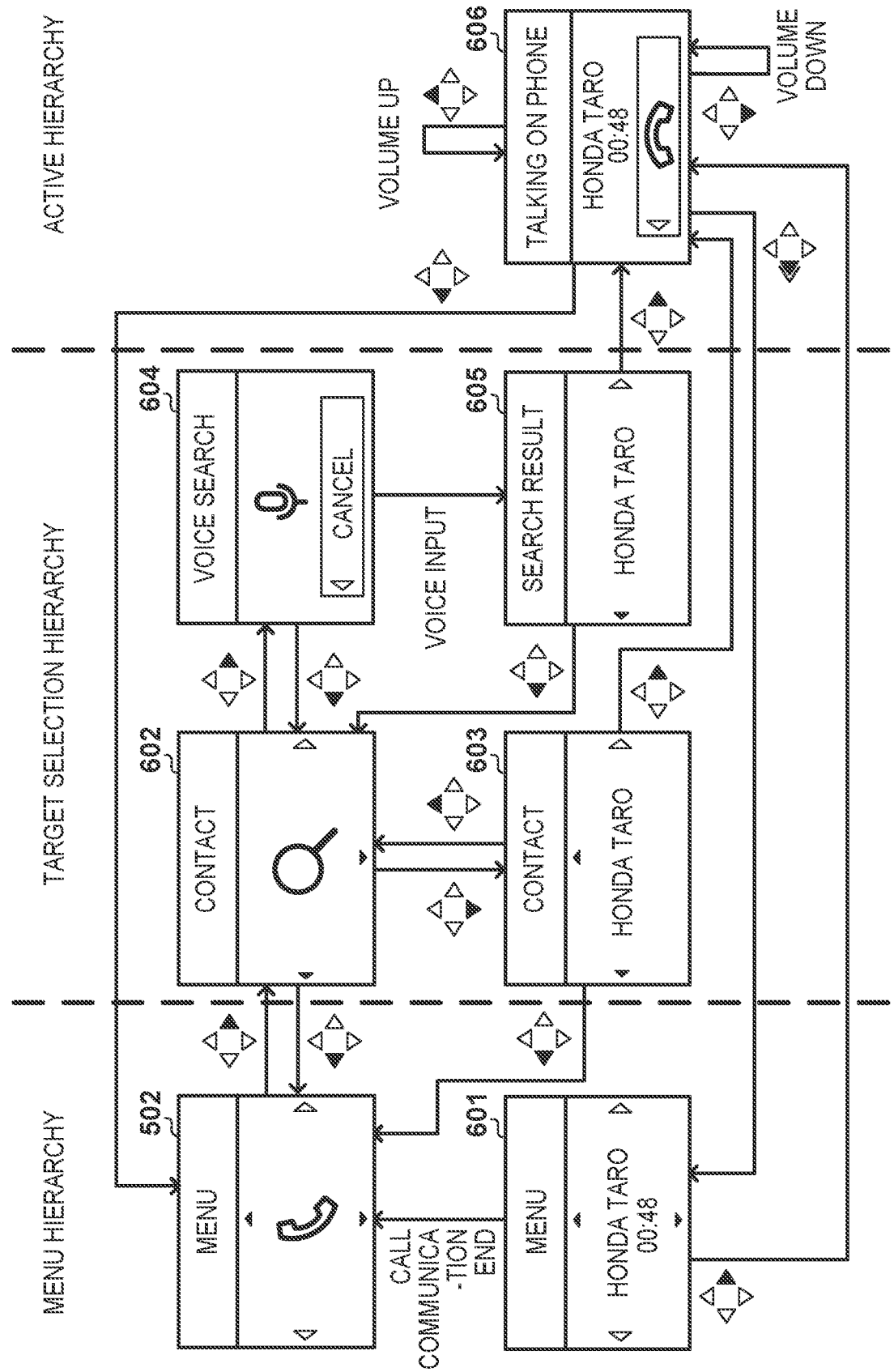
FIG. 6 is a diagram illustrating a display screen of a communication function in some embodiments.

A specific operation example of the call communication function will be described with reference to FIG. 6. In a state in which the image 502 is displayed, when acquiring a rightward short press input, the mobile device 310 transitions to transmission of an image 602. The image 602 is an image for requesting the driver to designate a call communication partner. The mobile device 310 may request the driver by sound to designate the call communication partner, together with the transmission of the image 602. In a state in which the image 602 is displayed, when acquiring a downward short press input, a rightward short press input, and a leftward short press input, the mobile device 310 transitions to transmission of an image 603, transmission of an image 604, and transmission of the image 502, respectively.

The image 603 is an image including a name of the call communication partner that has been set beforehand. In transitioning to transmission of the image 603, the mobile device 310 reads, from the memory 313, the name that has been set beforehand as a call communication partner, and includes the name in the image 603. The mobile device 310 may notify by sound the driver of the name of the call communication partner, together with the transmission of the image 603. In a state in which the image 603 is displayed, when acquiring an upward short press input, a rightward short press input, and a leftward short press input, the mobile device 310 transitions to transmission of the image 602, transmission of an image 606, and transmission of the image 502, respectively.

The image 604 is an image indicating a standby state of a voice search. The image 604 may include an image indicating an input direction for ending the voice search. The mobile device 310 may notify by sound the driver that the voice search is on a standby state, together with the transmission of the image 603. After transmitting the image 604, the mobile device 310 keeps on standby for a voice input via the headset 320. After acquiring the voice input, the mobile device 310 searches for the call communication partner from a contact list in the memory 313, based on the voice input. The mobile device 310 transitions to transmission of an image 605, when identifying the call communication partner, and does not transmit a new image, when not identifying the call communication partner (that is, the vehicle 100 is continuously displaying the image 604). When not identifying the call communication partner, the mobile device 310 may notify by sound the driver of the fact. In a state in which the image 604 is displayed, when acquiring a leftward short press input, the mobile device 310 transitions to transmission of the image 602.

The image 605 is an image including the name of the call communication partner that has been identified through the voice search. The mobile device 310 may notify by sound the driver of the name of the call communication partner that has been identified, together with the transmission of the image 605. In a state in which the image 605 is displayed, when acquiring a rightward short press input and a leftward short press input, the mobile device 310 transitions to transmission of the image 606 and transmission of the image 602, respectively.

The image 606 is an image indicating a performed situation of the call communication function. The image 606 may include a call communication partner and a call communication situation (while making a call or while talking on the phone (in such a case, its call communication duration)). The image 606 may include an image indicating an input direction for ending the call communication. The mobile device 310 starts making a call to the call communication partner, together with transmission of the image 606, and updates the image 606 in accordance with the call communication situation. The voices during the call communication are input and output between the mobile device 310 and the driver via the headset 320. In a state in which the image 606 is displayed, when acquiring a leftward short press input, the mobile device 310 ends the call communication and transitions to transmission of the image 502. In a state in which the image 606 is displayed, when acquiring an upward short press input or a downward short press input, the mobile device 310 increases or decreases the volume output from the headset 320. In a state in which the image 606 is displayed, when acquiring a leftward long press input, the mobile device 310 transitions to transmission of an image 601, while continuing the call communication.

The image 601 is a top image of the call communication function while the call communication function is being performed. On the other hand, the image 502 is a top image of the call communication function, while the call communication function is not being performed. The call communication function being performed may mean currently making a call to the call communication partner or talking on the phone with the call communication partner. The image 601 may include the call communication partner and the call communication situation (while making a call or while talking on the phone (in such a case, its call communication duration)). The image 601 is the top image. Therefore, in a state in which the image 601 is displayed, when acquiring an upward short press input or a downward short press input, the mobile device 310 switches the call communication function to another cooperative function. While the call communication function is being performed, when the call communication function is switched to another cooperative function, the mobile device 310 may maintain the call communication state. In a state in which the image 606 is displayed, when acquiring a rightward short press input, the mobile device 310 transitions to transmission of the image 601, while continuing the call communication. In a state in which the image 601 is displayed, when the call communication ends (the call communication partner ends talking), the mobile device 310 transitions to transmission of the image 502. The mobile device 310 does not have to receive an end instruction of the call communication from the driver, in a state in which the image 601 is displayed.

Figure 7:
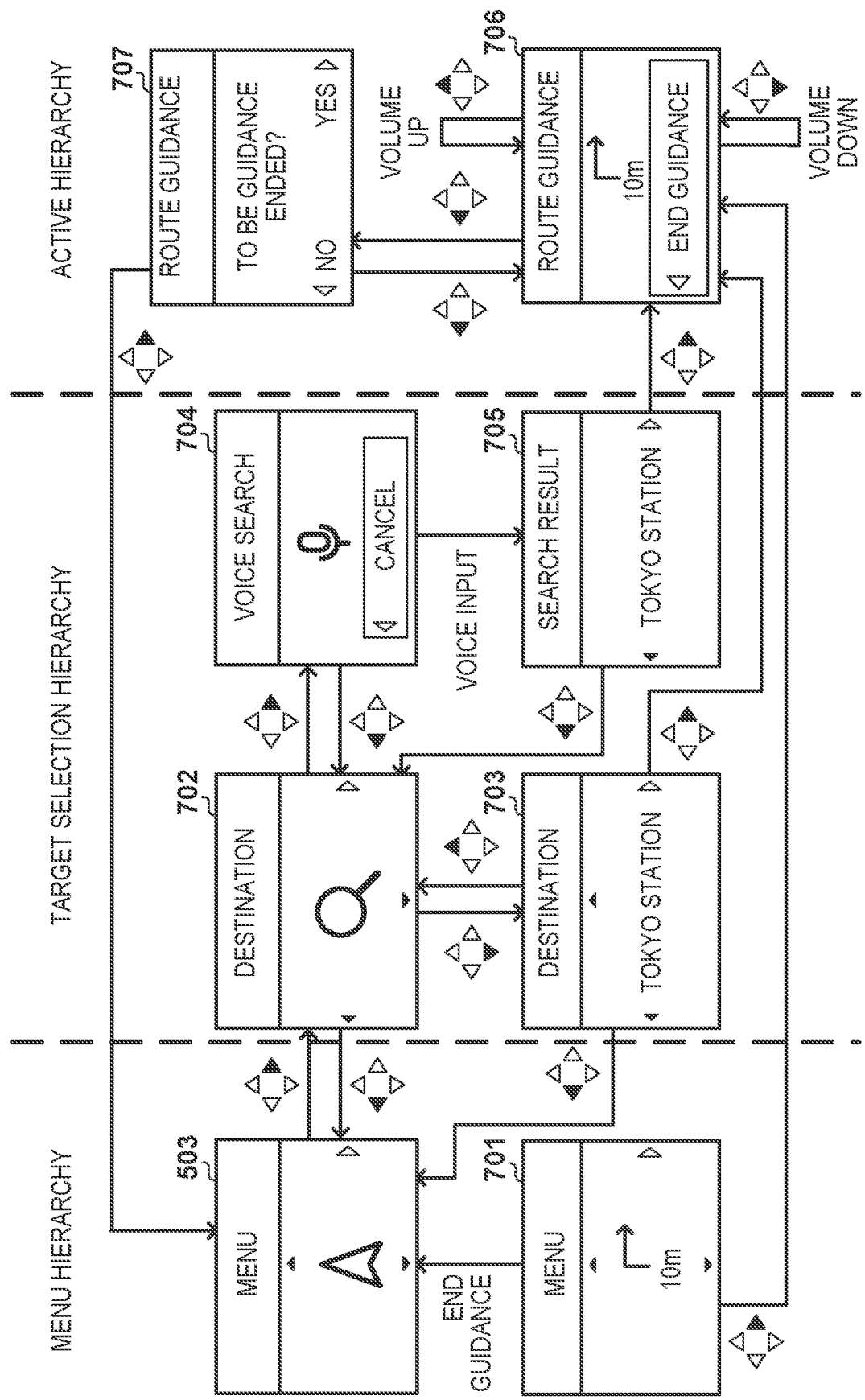
FIG. 7 is a diagram illustrating a display screen of a route guidance function in some embodiments.

A specific operation example of the route guidance function will be described with reference to FIG. 7. In a state in which the image 503 is displayed, when acquiring a rightward short press input, the mobile device 310 transitions to transmission of an image 702. The image 702 is an image for requesting the driver to designate a destination. The mobile device 310 may request the driver by sound to designate the destination, together with the transmission of the image 702. In a state in which the image 702 is displayed, when acquiring a downward short press input, a rightward short press input, and a leftward short press input, the mobile device 310 transitions to transmission of an image 703, transmission of an image 704, and transmission of the image 503, respectively.

The image 703 is an image including a destination that has been set beforehand. In transitioning to the transmission of the image 703, the mobile device 310 reads, from the memory 313, the place that has been set beforehand as the destination, and includes the place in the image 703. The mobile device 310 may notify by sound the driver of the destination that has been read, together with the transmission of the image 703. In a state in which the image 703 is displayed, when acquiring an upward short press input, a rightward short press input, and a leftward short press input, the mobile device 310 transitions to transmission of the image 702, transmission of an image 706, and transmission of the image 503, respectively.

The image 704 is an image indicating a standby state of a voice search. The image 704 may include an image indicating an input direction for ending the voice search. The mobile device 310 may notify by sound the driver that the voice search is on a standby state, together with the transmission of the image 703. After transmitting the image 704, the mobile device 310 keeps on standby for a voice input via the headset 320. After acquiring the voice input, the mobile device 310 identifies a destination from, for example, map information, based on the voice input. The mobile device 310 transitions to transmission of an image 705, when identifying the destination, and does not transmit a new image, when not identifying the destination (that is, the vehicle 100 is continuously displaying the image 704). When not identifying the destination, the mobile device 310 may notify by sound the driver of the fact. In a state in which the image 704 is displayed, when acquiring a leftward short press input, the mobile device 310 transitions to transmission of the image 702.

The image 705 is an image including the destination that has been identified by the voice search. The mobile device 310 may notify by sound the driver of the destination that has been identified, together with the transmission of the image 705. In a state in which the image 705 is displayed, when acquiring a rightward short press input and a leftward short press input, the mobile device 310 transitions to transmission of the image 706 and transmission of the image 702, respectively.

The image 706 is an image indicating a performed situation of the route guidance function. The image 706 may include a distance to a place to make a turn and a turning direction. The image 706 may include an image indicating an input direction for ending the route guidance. The mobile device 310 starts the route guidance, together with the transmission of the image 706, and updates the image 706 in accordance with the guidance situation. The sounds for the route guidance are output from the mobile device 310 to the driver via the headset 320. In a state in which the image 706 is displayed, when acquiring a leftward short press input, the mobile device 310 transitions to transmission of an image 707. In a state in which the image 706 is displayed, when acquiring an upward short press input or a downward short press input, the mobile device 310 increases or decreases the volume output from the headset 320.

The image 707 is an image for confirming whether to end the route guidance. The image 707 may include an image requesting confirmation and an image indicating an input direction for responding to the confirmation. In a state in which the image 707 is displayed, when acquiring a rightward short press input, the mobile device 310 ends the route guidance and transitions to transmission of the image 503. In a state in which the image 707 is displayed, when acquiring a rightward long press input, the mobile device 310 transitions to transmission of the image 706, while continuing the route guidance.

An image 701 is a top image of the route guidance function while the route guidance function is being performed. On the other hand, the image 503 is a top image of the route guidance function, while the route guidance function is not being performed. The route guidance function being performed may mean that the route is being guided for the driver. The image 701 may include a distance to a place to make a turn and a turning direction. As described above, in a state in which the route guidance function is being selected (that is, any of the images 503 and 701 to 707 is displayed), when acquiring a leftward long press input, the mobile device 310 transitions to transmission of the top image of the initial cooperative function. After that, when the route guidance function is selected again and in a case where the route guidance is being performed at the time of the previous selection, the mobile device 310 transmits the image 701 as the top image of the route guidance function.

The image 701 is the top image. Therefore, in a state in which the image 701 is displayed, when acquiring an upward short press input or a downward short press input, the mobile device 310 switches the route guidance function to another cooperative function. In a state in which the image 701 is displayed, when acquiring a rightward short press input, the mobile device 310 transitions to transmission of the image 706, while continuing the route guidance. In a state in which the image 701 is displayed, when the route guidance ends (when arriving at the destination), the mobile device 310 transitions to transmission of the image 503. The mobile device 310 does not have to receive an end instruction of the route guidance from the driver, in a state in which the image 701 is displayed.

Figure 8:
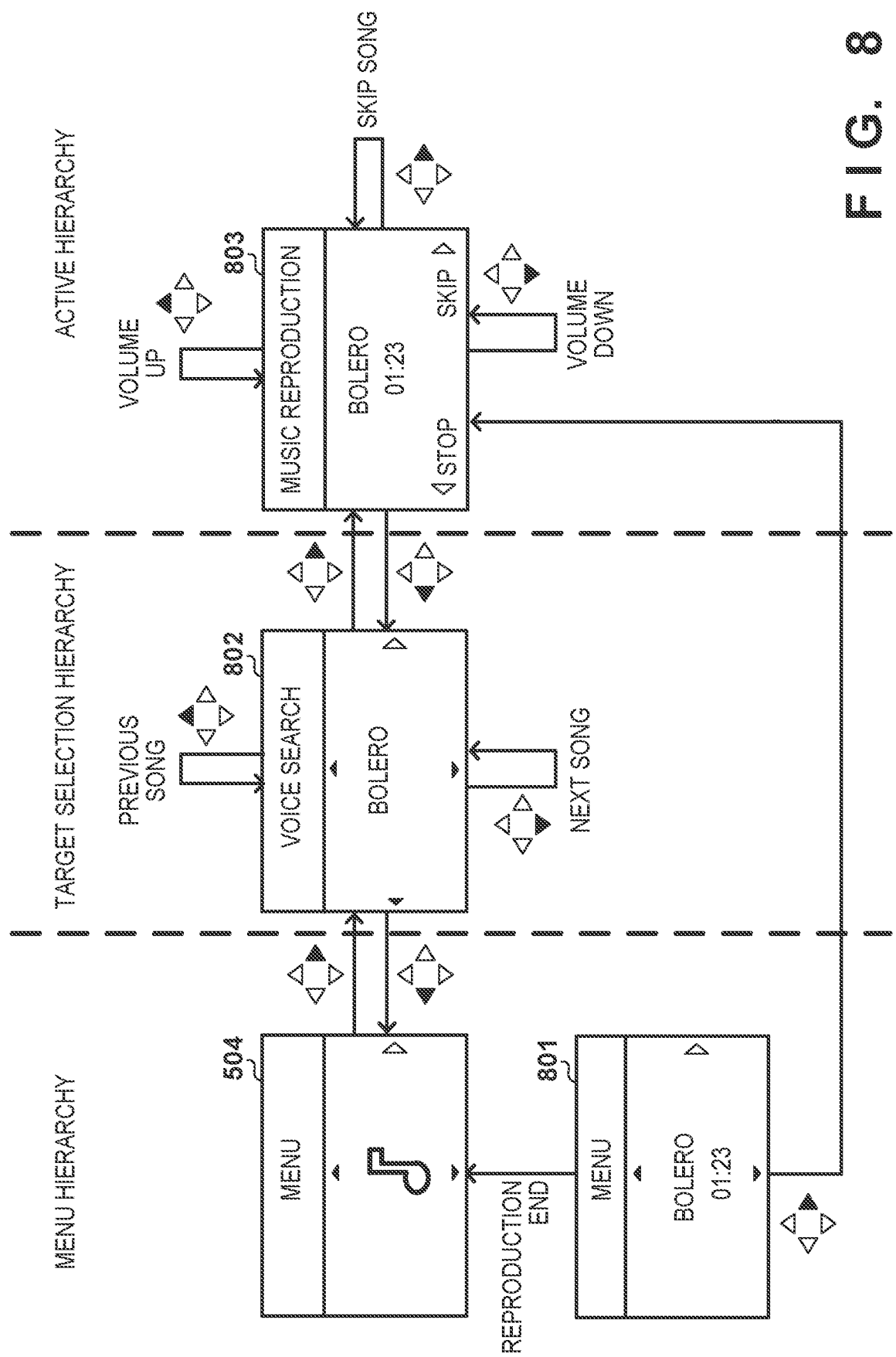
FIG. 8 is a diagram illustrating a display screen of a music reproducing function in some embodiments.

A specific operation example of the music reproducing function will be described with reference to FIG. 8. In a state in which the image 504 is displayed, when acquiring a rightward short press input, the mobile device 310 transitions to transmission of an image 802. The image 802 is an image for searching for music to be reproduced. The mobile device 310 selects one song from a playlist in the memory 313 together with transmission of the image 802, and includes the selected song in the image 802. The mobile device 310 may notify by sound the driver of the name of the selected song, together with the transmission of the image 802. In a state in which the image 802 is displayed, when acquiring a rightward short press input and a leftward short press input, the mobile device 310 transitions to transmission of an image 803 and transmission of the image 504, respectively. In the state in which the image 802 is displayed, when acquiring an upward short press input, the mobile device 310 selects a previous song in the playlist and updates the image 802 accordingly. In the state in which the image 802 is displayed, when acquiring a downward short press input, the mobile device 310 selects a next song in the playlist and updates the image 802 accordingly.

The image 803 is an image indicating a performed situation of the music reproducing function. The image 803 may include the name of a song that is being reproduced and a reproducing situation (reproducing time). The image 803 may include an image indicating an input direction for ending the reproduction and an input direction for skipping the song that is being reproduced. The mobile device 310 updates the image 803 in accordance with the reproducing situation, together with the transmission of the image 803. The song that is being played is output from the mobile device 310 to the driver via the headset 320. In a state in which the image 803 is displayed, when acquiring a leftward short press input, the mobile device 310 ends the reproduction and transitions to transmission of the image 802. In the state in which the image 803 is displayed, when acquiring a rightward short press input, the mobile device 310 selects a next song in the playlist and updates the image 803 accordingly. In a state in which the image 803 is displayed, when acquiring an upward short press input or a downward short press input, the mobile device 310 increases or decreases the volume output from the headset 320. In a state in which the image 806 is displayed, when acquiring a leftward long press input, the mobile device 310 transitions to transmission of the top image (in this example, the image 502) of the initial cooperative function, while continuing the reproduction.

On the other hand, an image 801 is a top image of the music reproducing function, while the music reproducing function is being performed. On the other hand, the image 504 is a top image of the music reproducing function, while the music reproducing function is not being performed. The music reproducing function being performed may mean that music is being reproduced for the driver. The image 801 may include the name of a song that is being reproduced and a reproducing situation (reproducing time). As described above, in a state in which the music reproducing function is being selected (that is, any of the images 504 and 801 to 803 is displayed), when acquiring a leftward long press input, the mobile device 310 transitions to transmission of the top image of the initial cooperative function. After that, when the music reproducing function is selected again and in a case where the music is being reproduced at the time of the previous selection, the mobile device 310 transmits the image 801 as the top image of the music reproducing function.

The image 801 is the top image. Therefore, in a state in which the image 801 is displayed, when acquiring an upward short press input or a downward short press input, the mobile device 310 switches the music reproducing function to another cooperative function. In a state in which the image 801 is displayed, when acquiring a rightward short press input, the mobile device 310 transitions to transmission of the image 803, while continuing the music reproduction. In a state in which the image 801 is displayed, when the music reproduction ends (when the playlist completes), the mobile device 310 transitions to transmission of the image 504. The mobile device 310 does not have to receive an end instruction of the music reproduction from the driver, in a state in which the image 801 is displayed.

Figure 9:
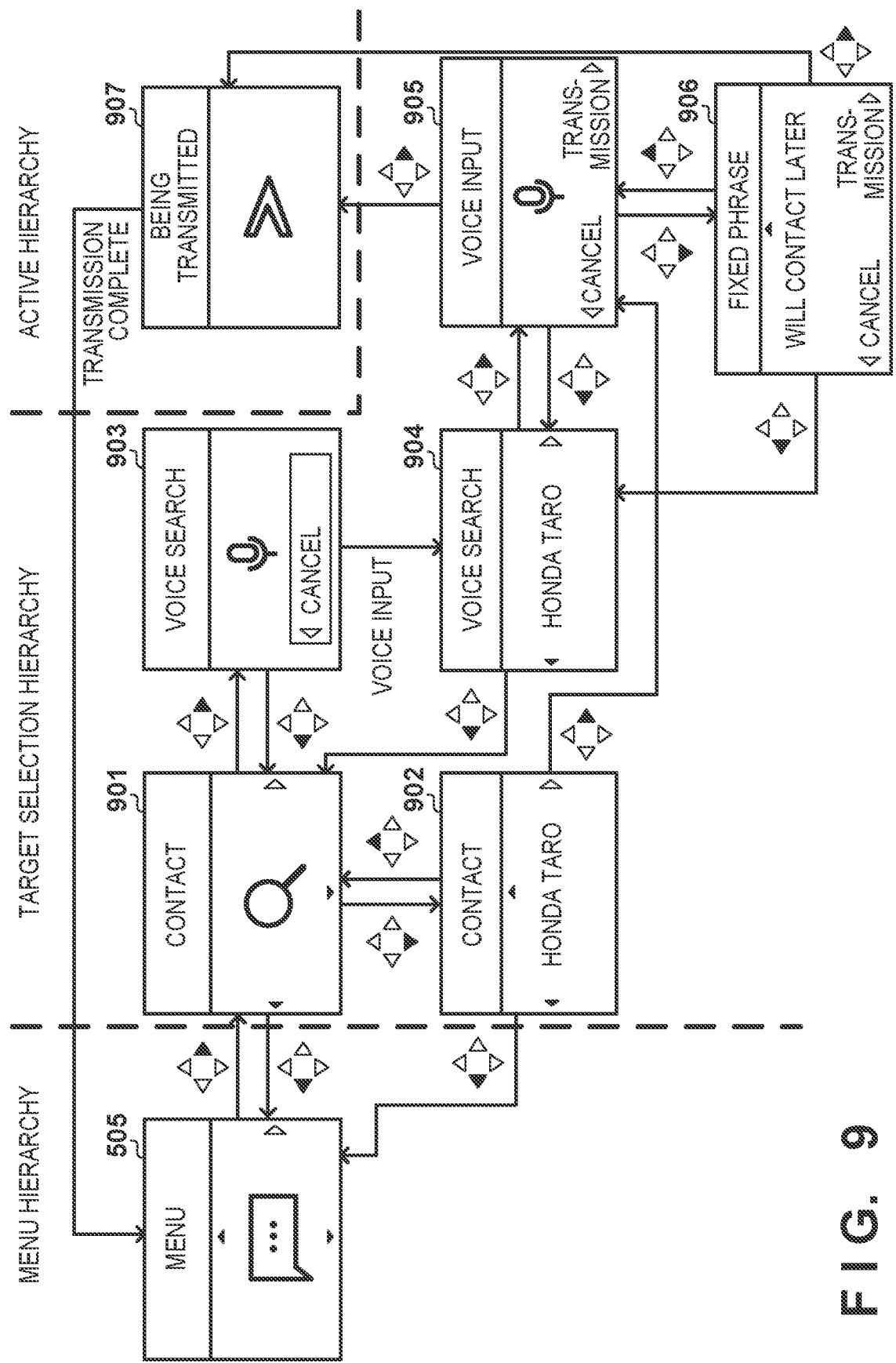
FIG. 9 is a diagram illustrating a display screen of a messaging function in some embodiments.

A specific operation example of the messaging function will be described with reference to FIG. 9. In a state in which the image 505 is displayed, when acquiring a rightward short press input, the mobile device 310 transitions to transmission of an image 901. The image 901 is an image for requesting the driver to designate a transmission destination. The mobile device 310 may request the driver by sound to designate a transmission destination, together with the transmission of the image 901. In a state in which the image 901 is displayed, when acquiring a downward short press input, a rightward short press input, and a leftward short press input, the mobile device 310 transitions to transmission of an image 902, transmission of an image 903, and transmission of the image 505, respectively.

The image 902 is an image including a name of the transmission destination that has been set beforehand. In transitioning to transmission of the image 902, the mobile device 310 reads, from the memory 313, the name that has been set beforehand as the transmission destination, and includes the name in the image 902. The mobile device 310 may notify by sound the driver of the name of the transmission destination, together with the transmission of the image 902. In a state in which the image 902 is displayed, when acquiring an upward short press input, a rightward short press input, and a leftward short press input, the mobile device 310 transitions to transmission of the image 901, transmission of an image 905, and transmission of the image 505, respectively.

The image 903 is an image indicating a standby state of a voice search. The image 903 may include an image indicating an input direction for ending the voice search. The mobile device 310 may notify by sound the driver that the voice search is on a standby state, together with the transmission of the image 902. After transmitting the image 903, the mobile device 310 keeps on standby for a voice input via the headset 320. After acquiring the voice input, the mobile device 310 searches for a transmission destination from the contact list in the memory 313, based on the voice input. The mobile device 310 transitions to transmission of an image 904, when identifying the transmission destination, and does not transmit a new image, when not identifying the transmission destination (that is, the vehicle 100 is continuously displaying the image 903). When not identifying the transmission destination, the mobile device 310 may notify by sound the driver of the fact. In a state in which the image 903 is displayed, when acquiring a leftward short press input, the mobile device 310 transitions to transmission of the image 901.

The image 904 is an image including the name of the transmission destination that has been identified by the voice search. The mobile device 310 may notify by sound the driver of the name of the transmission destination identified, together with the transmission of the image 904. In a state in which the image 904 is displayed, when acquiring a rightward short press input and a leftward short press input, the mobile device 310 transitions to transmission of the image 905 and transmission of the image 901, respectively.

The image 905 is an image indicating a standby state of a voice input. The image 905 may include an image indicating an input direction for ending the voice input and an input direction for starting the transmission. The mobile device 310 may notify by sound the driver that the voice input is on a standby state, together with the transmission of the image 905. After transmitting the image 905, the mobile device 310 keeps on standby for a voice input via the headset 320. The mobile device 310 acquires the voice that has been input as a message to be transmitted. In a state in which the image 903 is displayed, when acquiring a leftward short press input, a rightward short press input, and a downward short press input, the mobile device 310 transitions to transmission of the image 904, transmission of an image 907, and transmission of an image 906, respectively.

The image 906 is an image including a fixed phrase of the message that has been set beforehand. In transitioning to transmission of the image 906, the mobile device 310 reads, from the memory 313, the fixed phrase of the message that has been set beforehand, and includes the fixed phrase in the image 906. The image 906 may further include an image indicating an input direction for canceling the transmission and an input direction for starting the transmission. The mobile device 310 may notify by sound the driver of the fixed phrase that has been read, together with the transmission of the image 906. In a state in which the image 906 is displayed, when acquiring an upward short press input, a rightward short press input, and a leftward short press input, the mobile device 310 transitions to transmission of the image 905, transmission of the image 907, and transmission of the image 904, respectively.

The image 907 is an image indicating a performed situation of the messaging function. The image 907 may include an image indicating that a message is being transmitted. The mobile device 310 starts transmission of the message to the transmission destination, together with transmission of the image 907. After the transmission ends, the mobile device 310 transitions to transmission of the image 505.

As illustrated in FIGS. 6 to 9, the images (that is, the cooperative images) transmitted by the respective cooperative functions are classified into three hierarchies of a menu hierarchy, a target selection hierarchy, and an active hierarchy. The menu hierarchy includes the top image of the cooperative function that is being selected. The target selection hierarchy includes an image for selecting a performed target of the cooperative function that is being selected. The active hierarchy includes an image indicating the performed situation of the cooperative function that is being selected.

In each cooperative function having the target selection hierarchy, the transition from the menu hierarchy to the target selection hierarchy is performed in accordance with a rightward short press input. In addition, in each cooperative function having the active hierarchy, the transition from the target selection hierarchy to the active hierarchy is performed in accordance with a rightward short press input. In this manner, any transition between the hierarchies is performed in accordance with the rightward short press input. Thus, the driver is able to intuitively transition between the hierarchies. Further, a switch, such as a determination switch, other than the direction switch is unnecessary. Furthermore, the transition from the active hierarchy to the target selection hierarchy and the transition from the target selection hierarchy to the menu hierarchy are performed in accordance with a leftward short press input that is opposite in direction to the rightward short press input. Therefore, the driver is able to intuitively return the hierarchy. In addition, when the mobile device 310 transitions from the menu hierarchy to the target selection hierarchy and transitions from the target selection hierarchy to the active hierarchy, confirmation of the driver with an image is not conducted. Accordingly, the amount of operations before performing a process can be reduced.

In each hierarchy, an upward short press input and a downward short press input are used for transitioning between processes in an identical hierarchy. As described above, the horizontal switch 200H is a tilting switch, and the up switch 200U and the down switch 200D are separate pressing type switches. Therefore, a moving amount of the driver's finger is smaller in the horizontal direction than that in a vertical direction. In the above-described embodiment, the moving amount of the driver's finger can be reduced by transitioning between the hierarchies with an input in the horizontal direction.

In the target selection hierarchy, the transition to the voice search is made in accordance with a rightward short press input. In this manner, by enabling the transition to the voice search in accordance with an input in the same direction with the transition to a deeper hierarchy (the rightward short press input), a unified operational feel is provided.

Figure 10:
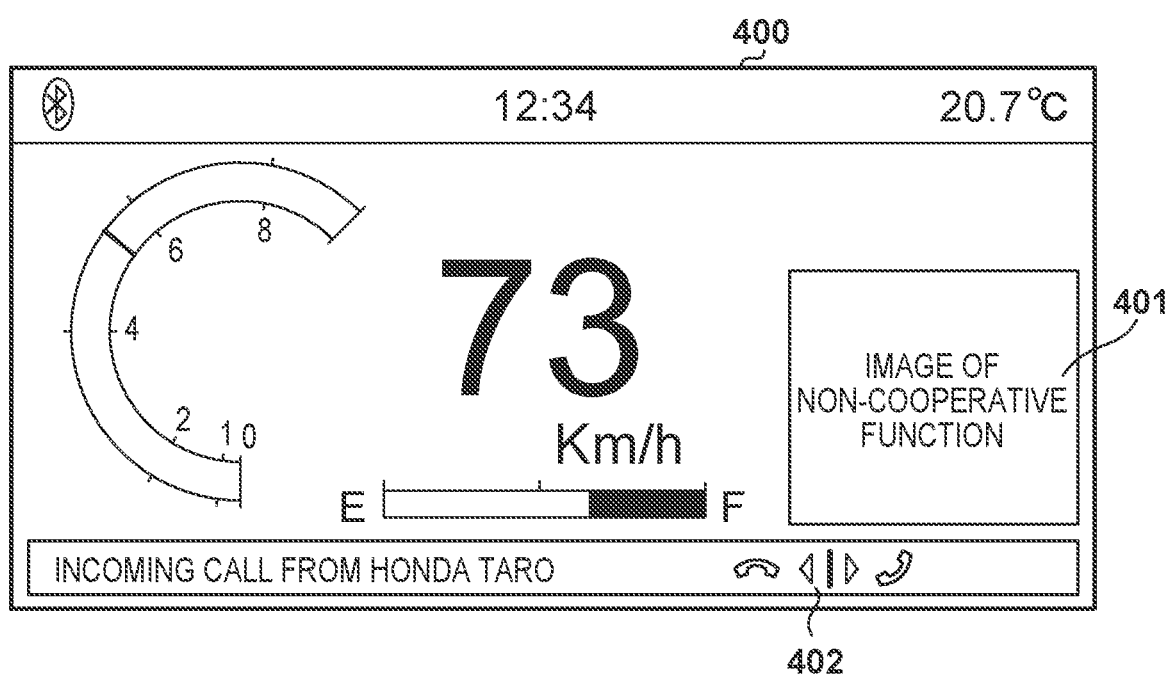
FIG. 10 is a diagram illustrating a display on the vehicle in some embodiments.

A specific example of an interruption process by a cooperative function will be described with reference to FIG. 10. The interruption process means a process in which the mobile device 310 requests the vehicle 100 to start a cooperative function regardless of an instruction of the driver. For example, the mobile device 310 requests the start of the interruption process, when there is an incoming call from another person or when a message is received from another person.

When the mobile device 310 receives an incoming call, the mobile device 310 transmits an image (that is, an interruption image) related to the interruption process for the call communication function to the vehicle 100, and the vehicle 100 displays the interruption image in the area 402 of the screen 400. The interruption image may include the name of a caller, an input direction for making an instruction to answer the incoming call, and an input direction for making an instruction not to answer the incoming call. At this point in time, in a case where a cooperative function other than the call communication function is being selected, the image of the selected cooperative function is displayed in the area 401. On the other hand, at this point in time, in a case where the cooperative function is not being performed, an image other than the cooperative function is displayed in the area 401. In a state in which the interruption image is displayed, when acquiring a rightward short press input, the mobile device 310 responds to the incoming call, and transitions to transmission of the image 606. At this point in time, the cooperative image (specifically, the image 606) is displayed in the area 401. At this point in time, the vehicle 100 may delete the interruption image from the area 402 to display an image of a non-cooperative function. Also when the mobile device 310 receives a message, a similar process is performed.

An operation example of a method for controlling the mobile device 310 will be described with reference to FIG. 11. This method may be started, when the mobile device 310 is activated. Each step in the following operation is performed by the control unit 311 of the mobile device 310.

In step S1101, the control unit 311 establishes a communication link with the vehicle 100 and with the headset 320. As described above, such a communication link may be short-range wireless communication such as Bluetooth. The control unit 311 may establish the communication link first with either the vehicle 100 or the headset 320, or may establish the communication links simultaneously. Further, the communication link with the headset 320 may be established at the time when the sound is output to the headset 320.

In step S1102, the control unit 311 determines whether an instruction to start cooperation has been acquired. In a case where this instruction has been acquired (YES in S1102), the control unit 311 transitions the process to step S1103, and in the other case (NO in S1102), the control unit 311 repeats step S1102. In the above-described example, upon receipt of a leftward long press input from the vehicle 100, the control unit 311 determines that the instruction to start the cooperation has been acquired.

In step S1103, the control unit 311 transmits the top image (in the above-described example, the image 502) of the initial cooperative function to the vehicle 100. At this point in time, the initial cooperative function (in the above-described example, the call communication function) is selected.

In step S1104, the control unit 311 determines whether an instruction to change the cooperative function that is being selected has been acquired. In a case where this instruction has been acquired (YES in S1104), the control unit 311 transitions the process to step S1105, and in the other case (NO in S1104), the control unit 311 transitions the process to step S1106. In the above-described example, upon receipt of an upward short press input or a downward short press input from the vehicle 100, the control unit 311 determines that the instruction to change the cooperative function has been acquired.

In step S1105, the control unit 311 changes the cooperative function that is being selected, and transmits the top image of the cooperative function after the change to the vehicle 100.

In step S1106, the control unit 311 determines whether an instruction related to the cooperative function that is being selected has been acquired. In a case where this instruction has been acquired (YES in S1106), the control unit 311 transitions the process to step S1107, and in the other case (NO in S1106), the control unit 311 transitions the process to step S1108.

In step S1107, the control unit 311 performs a process of the cooperative function that is being selected in accordance with the instruction that has been acquired. The process of the cooperative function has been described in detail with reference to FIGS. 6 to 9, and will not be repeated here.

In step S1108, the control unit 311 determines whether an instruction to end the cooperation has been acquired. In a case where this instruction has been acquired (YES in S1108), the control unit 311 transitions the process to step S1102, and in the other case (NO in S1108), the control unit 311 transitions the process to step S1104. In the above-described example, upon receipt of a rightward long press input from the vehicle 100, the control unit 311 determines that the instruction to end the cooperation has been acquired.

An operation example of the interruption process when the call communication function of the mobile device 310 receives an incoming call will be described with reference to FIG. 12. This method may be started, when the mobile device 310 is activated. Each step in the following operation is performed by the control unit 311 of the mobile device 310.

In step S1201, the control unit 311 determines whether an incoming call has been received. In a case where the incoming call has been received (YES in S1201), the control unit 311 transitions the process to step S1202, and in the other case (NO in S1201), the control unit 311 repeats step S1201.

In step S1202, the control unit 311 generates an interruption image, and transmits the interruption image to the vehicle 100. The interruption image may include the name of a caller, an input direction for making an instruction to answer the incoming call, and an input direction for making an instruction not to answer the incoming call. The control unit 311 may notify by sound that the incoming call is arriving, together with transmission of the interruption image. At this point in time, in a case where the communication link with the vehicle 100 is not established, the control unit 311 establishes the communication link with the vehicle 100.

In step S1203, the control unit 311 determines whether the instruction to answer the incoming call has been acquired. In a case where this instruction has been acquired (YES in S1203), the control unit 311 transitions the process to step S1204, and in the other case (NO in S1203), the control unit 311 ends the process. For example, the control unit 311 may regard a rightward short press input as the instruction to answer the incoming call, and may regard a leftward short press input as the instruction not to answer the incoming call.

In step S1204, the control unit 311 starts call communication, and also transmits an image (that is, the image 606) of the active hierarchy of the call communication function to the vehicle. The control unit 311 may transmit the image 601, instead of transmitting the image 606. At this point in time, in a case where a cooperative function other than the call communication function is being performed, the control unit 311 may end the function in accordance with a priority of the cooperative function that is being performed. For example, in a case where the priority of the music reproducing function is set to be lower than the priority of the call communication function, the control unit 311 ends the music reproducing function that is being performed.

In step S1205, the control unit 311 determines whether the call communication has been ended. In a case where the call communication has been ended (YES in S1205), the control unit 311 ends the process, and in the other case (NO in S1205), the control unit 311 repeats step S1205. After the call communication ends, the control unit 311 may maintain a cooperative state with the vehicle 100, or may end the cooperation with the vehicle 100. Further, in a case where another cooperative function is being performed when the interruption process starts, the control unit 311 may restart the cooperative function.

An operation example of the interruption process when the messaging function of the mobile device 310 receives a message will be described with reference to FIG. 13. This method may be started, when the mobile device 310 is activated. Each step in the following operation is performed by the control unit 311 of the mobile device 310.

In step S1301, the control unit 311 determines whether a new message has been received. In a case where the new message has been received (YES in S1301), the control unit 311 transitions the process to step S1302, and in the other case (NO in S1301), the control unit 311 repeats step S1301.

In step S1302, the control unit 311 determines whether a non-response setting is turned on. In a case where the non-response setting is turned on (YES in S1302), the control unit 311 ends the process, and in the other case (NO in S1302), the control unit 311 transitions the process to step S1303. The non-response setting is a setting related to whether to transmit an interruption image to the vehicle 100, upon receipt of the new message. This setting may be turned on by default, or may be turned on by the driver. The setting value may be stored in the memory 313.

In step S1303, the control unit 311 determines whether an automatic response setting is turned on. In a case where the automatic response setting is turned on (YES in S1303), the control unit 311 transitions the process to step S1304, and in the other case (NO in S1303), the control unit 311 transitions the process to step S1305. The automatic response setting is a setting related to whether the mobile device 310 automatically responds, upon receipt of the new message. This setting may be turned on by default, or may be turned on by the driver. The setting value may be stored in the memory 313.

In step S1304, the control unit 311 automatically responds to the message that has been received. For example, the control unit 311 may return a fixed-phrase message indicating that the receiver is currently driving the vehicle.

In step S1305, the control unit 311 generates an interruption image, and transmits the interruption image to the vehicle 100. The interruption image may include the name of a sender, an input direction for making an instruction to respond to the message, and an input direction for making an instruction not to respond to the message. The control unit 311 may notify by sound that the message has been received, together with transmission of the interruption image. At this point in time, in a case where the communication link with the vehicle 100 is not established, the control unit 311 establishes the communication link with the vehicle 100.

In step S1306, the control unit 311 determines whether an automatic reading setting is turned on. In a case where the automatic reading setting is turned on (YES in S1306), the control unit 311 transitions the process to step S1307, and in the other case (NO in S1306), the control unit 311 transitions the process to step S1308. The automatic reading setting is a setting related to whether the mobile device 310 automatically reads the message, upon receipt of the new message. This setting may be turned on by default, or may be turned on by the driver. The setting value may be stored in the memory 313.

In step S1307, the control unit 311 transmits the sound for reading the message that has been received to the headset 320, and the headset 320 outputs the sound to the driver. At this point in time, in a case where the communication link with the headset 320 is not established, the control unit 311 establishes the communication link with the headset 320. At this point in time, in a case where a cooperative function other than the messaging function is being performed, the control unit 311 may end the function in accordance with the priority of the cooperative function that is being performed. For example, in a case where the priority of the music reproducing function is set to be lower than the priority of the messaging function, the control unit 311 ends the music reproducing function that is being performed.

In step S1308, the control unit 311 determines whether the instruction to respond to the message has been acquired. In a case where the instruction to respond to the message has been acquired (YES in S1308), the control unit 311 transitions the process to step S1309, and in the other case (NO in S1308), the control unit 311 ends the process. For example, the control unit 311 may regard a rightward short press input as an instruction to respond to the message, and may regard a leftward short press input as an instruction not to respond to the message.

In step S1309, the control unit 311 transitions to transmission of the image 905 in order to create a message, and returns the message that has been created by voice input. After transmitting the message, the control unit 311 may maintain the cooperative state with the vehicle 100, or may end the cooperation with the vehicle 100. Further, in a case where another cooperative function is being performed when the interruption process starts, the control unit 311 may restart the cooperative function.

Figure 14:
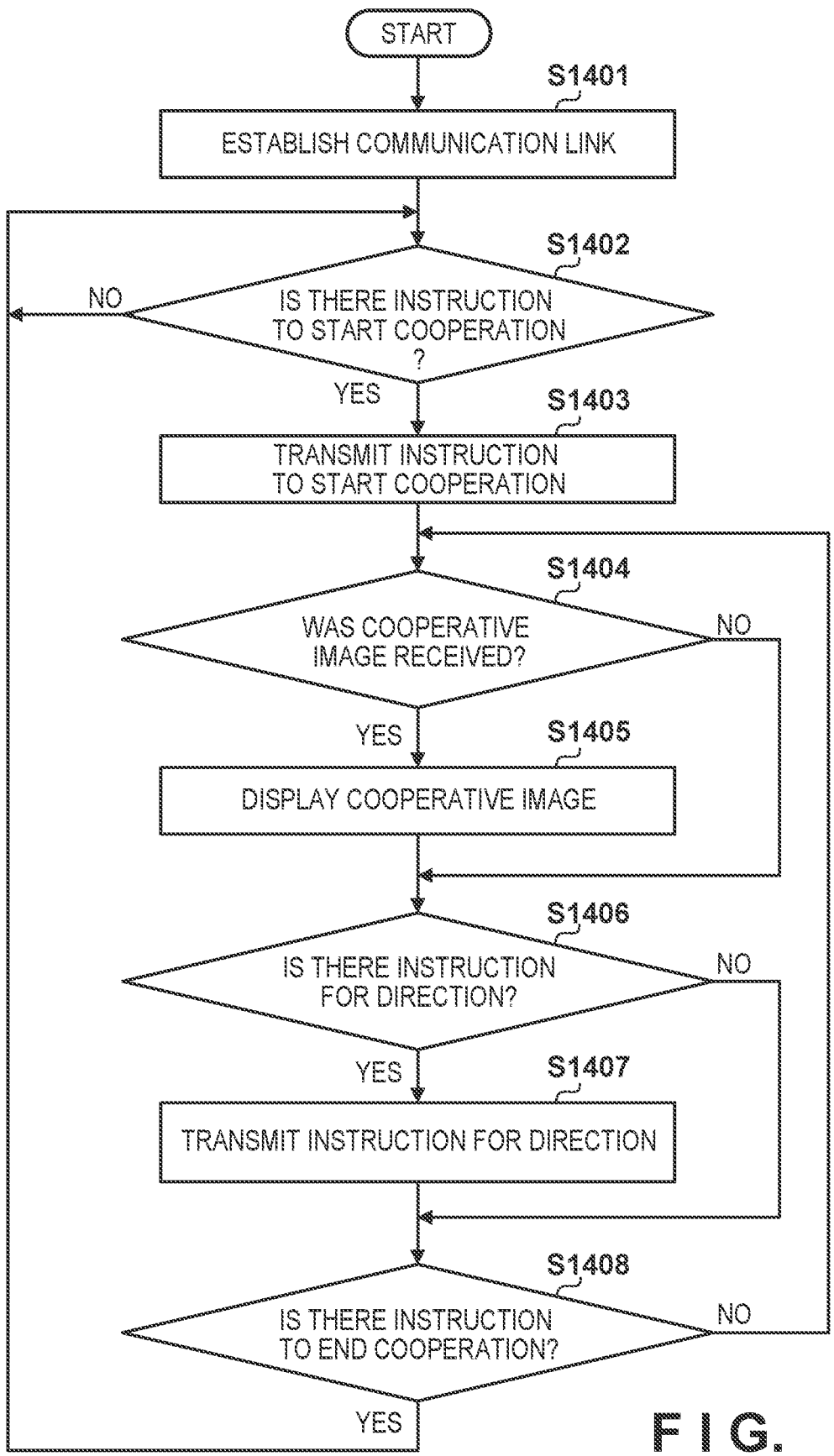
FIG. 14 is a diagram illustrating an operation of the vehicle in some embodiments.

An operation example of a method for controlling the vehicle 100 will be described with reference to FIG. 14. This method may be started, when the vehicle 100 is activated. Each step in the following operation is performed by the control unit 301 of the vehicle 100.

In step S1401, the control unit 301 establishes a communication link with the mobile device 310. As described above, such a communication link may be short-range wireless communication such as Bluetooth. The communication link with the mobile device 310 may be established at the time when an instruction is transmitted to the mobile device 310.

In step S1402, the control unit 301 determines whether an instruction to start cooperation has been acquired. In a case where this instruction has been acquired (YES in S1402), the control unit 301 transitions the process to step S1403, and in the other case (NO in S1402), the control unit 301 repeats step S1402. In the above-described example, when acquiring a leftward long press input via the direction switch 200, the control unit 301 determines that the instruction to start the cooperation has been acquired.

In step S1403, the control unit 301 transmits the instruction to start the cooperation to the mobile device 310. The control unit 301 may transmit the leftward long press input as it is, in other words, may transmit given information with which the mobile device 310 is capable of recognizing the start of the cooperation.

In step S1404, the control unit 301 determines whether a cooperative image has been received from the mobile device 310. In a case where the cooperative image has been received (YES in S1404), the control unit 301 transitions the process to step S1405, and in the other case (NO in S1404), the control unit 301 transitions the process to step S1406.

In step S1405, the control unit 301 displays the cooperative image that has been received, in the area 401 of the screen 400 of the display device 101.

In step S1406, the control unit 301 determines whether a direction instruction has been acquired. In a case where the direction instruction has been acquired (YES in S1406), the control unit 301 transitions the process to step S1407, and in the other case (NO in S1406), the control unit 301 transitions the process to step S1408. The control unit 301 determines that the direction instruction has been acquired, in a case where any of upward, downward, leftward, and rightward inputs is acquired via the direction switch 200.

In step S1407, the control unit 301 transmits the direction instruction that has been acquired to the mobile device 310.

In step S1408, the control unit 301 determines whether an instruction to end the cooperation has been acquired. In a case where this instruction has been acquired (YES in S1408), the control unit 301 transitions the process to step S1402, and in the other case (NO in S1408), the control unit 301 transitions the process to step S1404. In the above-described example, when acquiring a rightward long press input via the direction switch 200, the control unit 301 determines that the instruction to end the cooperation has been acquired.

Figure 15:
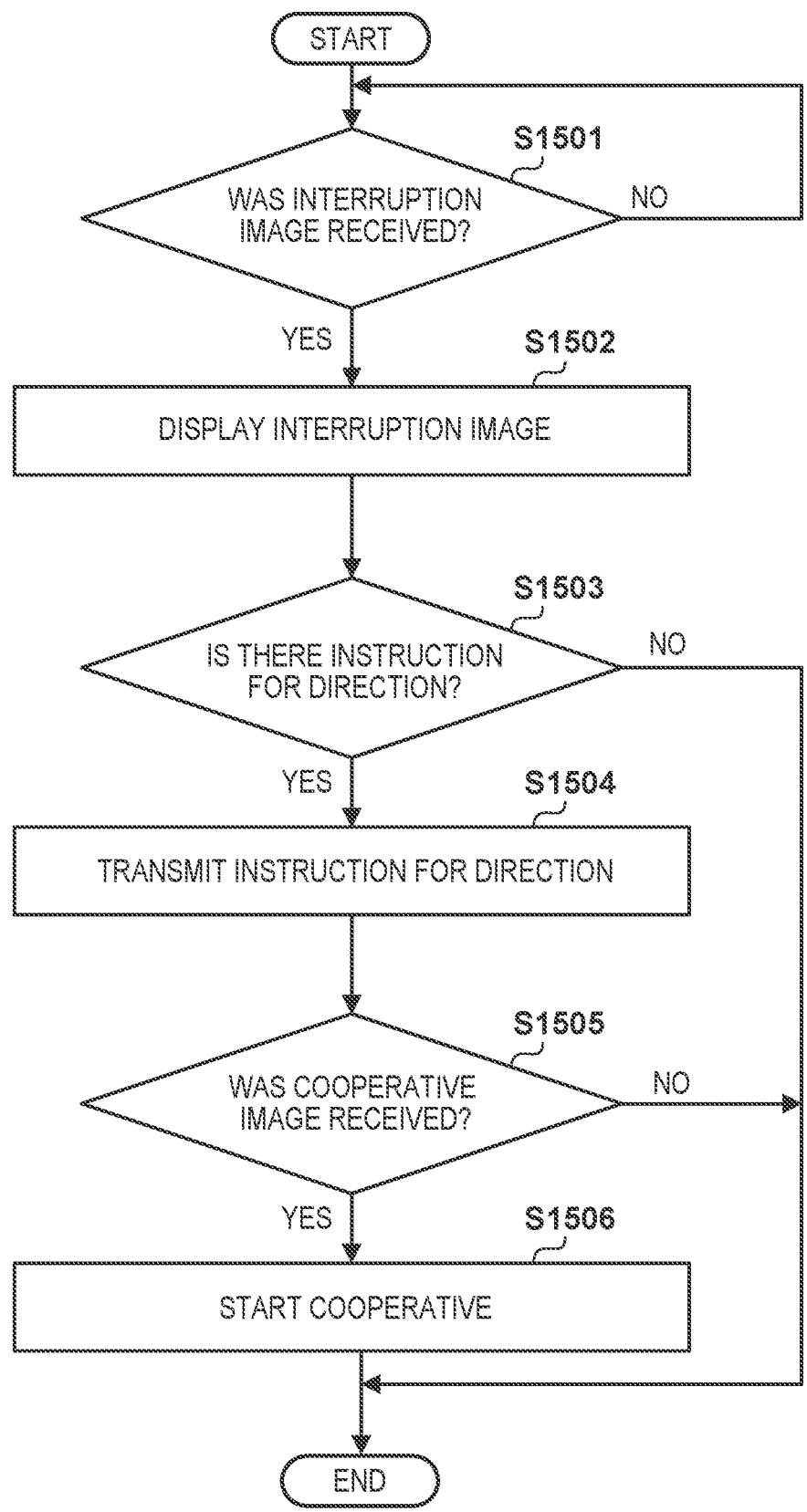
FIG. 15 is a diagram illustrating an operation of the vehicle in some embodiments.

An operation example of the interruption process in the vehicle 100 will be described with reference to FIG. 15. This method may be started, when the vehicle 100 is activated. Each step in the following operation is performed by the control unit 301 of the vehicle 100.

In step S1501, the control unit 301 determines whether an interruption image has been received from the mobile device 310. In a case where the interruption image has been received (YES in S1501), the control unit 301 transitions the process to step S1502, and in the other case (NO in S1501), the control unit 301 repeats step S1501.

In step S1502, the control unit 301 displays the interruption image that has been received in the area 402 of the screen 400 of the display device 101.

In step S1503, the control unit 301 determines whether a direction instruction has been acquired. In a case where the direction instruction has been acquired (YES in S1503), the control unit 301 transitions the process to step S1504, and in the other case (NO in S1503), the control unit 301 ends the process. The control unit 301 determines that the direction instruction has been acquired, in a case where any of upward, downward, leftward, and rightward inputs is acquired via the direction switch 200.

In step S1504, the control unit 301 transmits the direction instruction that has been acquired to the mobile device 310.

In step S1505, the control unit 301 determines whether the cooperative image has been received from the mobile device 310. In a case where the cooperative image has been acquired (YES in S1505), the control unit 301 transitions the process to step S1506, and in the other case (NO in S1505), the control unit 301 ends the process.

In step S1506, the control unit 301 starts the cooperative operation with the mobile device 310. In a case where the cooperative operation is started due to the interruption process, the control unit 301 may end the cooperative operation after the interruption process ends.

In the above-described method, the vehicle 100 displays the cooperative image and the interruption image that have been received from the mobile device 310 on the display device 101. Instead of this, the vehicle 100 may receive information necessary for generating the cooperative image and the interruption image from the mobile device 310, may create the cooperative image and the interruption image using such information, and may display the cooperative image and the interruption image on the display device 101.

Figure 16:
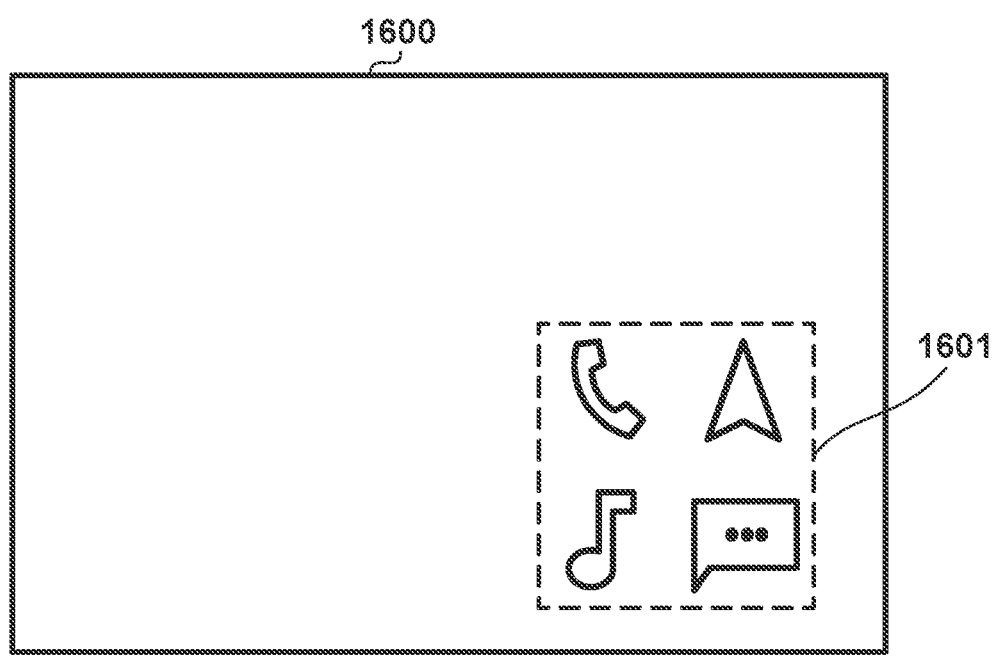
FIG. 16 is a diagram illustrating a display on the vehicle in some embodiments.

Next, an embodiment (hereinafter, referred to as a second embodiment) in a case where the display device 101 is an aggregation of indicators will be described. FIG. 16 illustrates a display example of the display unit 304 in the cooperative operation between the vehicle 100 and the mobile device 310. The display device 101 includes an indicator arrangement area 1600. The indicator arrangement area 1600 includes an area 1601 in which four indicators indicating the state of the cooperative function are arranged. In the indicator arrangement area 1600, an indicator that is not related to the cooperative function is arranged in a part other than the area 1601. The indicator that is not related to the cooperative function may be an existing one, and its detailed description will be omitted.

In the second embodiment, the mobile device 310 may provide two or more of the call communication function, the messaging function, the music reproducing function, and the route guidance function. Hereinafter, a case where the mobile device 310 provides all of the four cooperative functions will be described.

Regarding the transmission of the direction instruction from the vehicle 100 to the mobile device 310, the second embodiment may be similar to the first embodiment. On the other hand, in the second embodiment, the mobile device 310 transmits an instruction of a lighting situation of the indicator, instead of transmitting the cooperative image and the interruption image to the vehicle 100.

The operations in the second embodiment are similar to the operations that have been described in FIGS. 11 to 15 in the first embodiment. In the following, differences will be described. Before performing the cooperative operation, the vehicle 100 lights off all the indicators in the area 1601.

Figure 11:
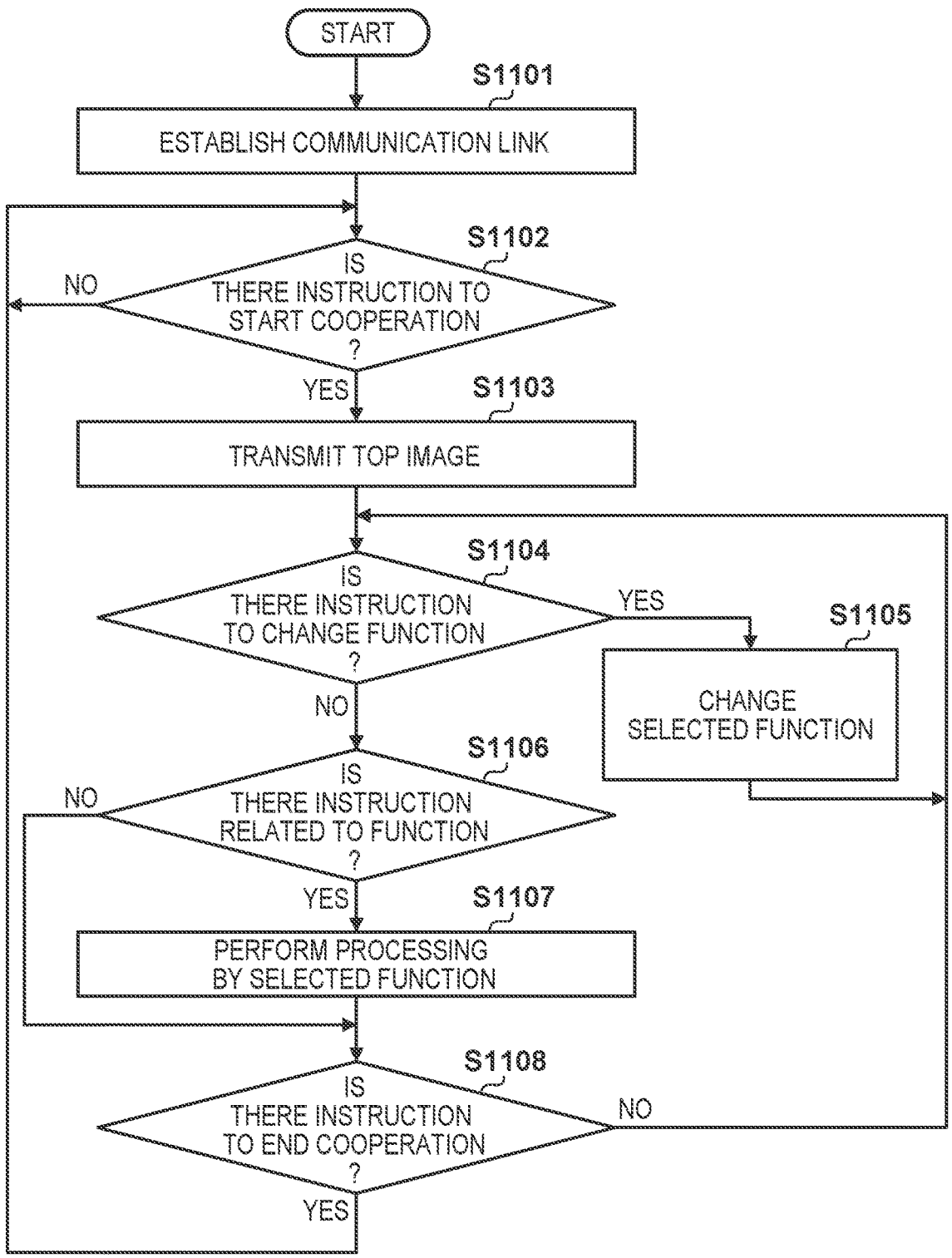
FIG. 11 is a diagram illustrating an operation of the mobile device in some embodiments.

The mobile device 310 transmits information indicating the cooperative function that is being selected to the vehicle 100, instead of transmitting the top image in step S1103 in FIG. 11. The vehicle 100 determines whether the information indicating the cooperative function that is being selected has been received, instead of determining whether the cooperative image has been received in step S1404 in FIG. 14 and step S1505 in FIG. 15. The vehicle 100 turns on an indicator indicating the cooperative function that is being selected, instead of displaying the cooperative image in step S1405 of FIG. 14. For example, while the call communication function is being selected, the vehicle 100 turns on an upper left indicator in the area 1601.

Figure 12:
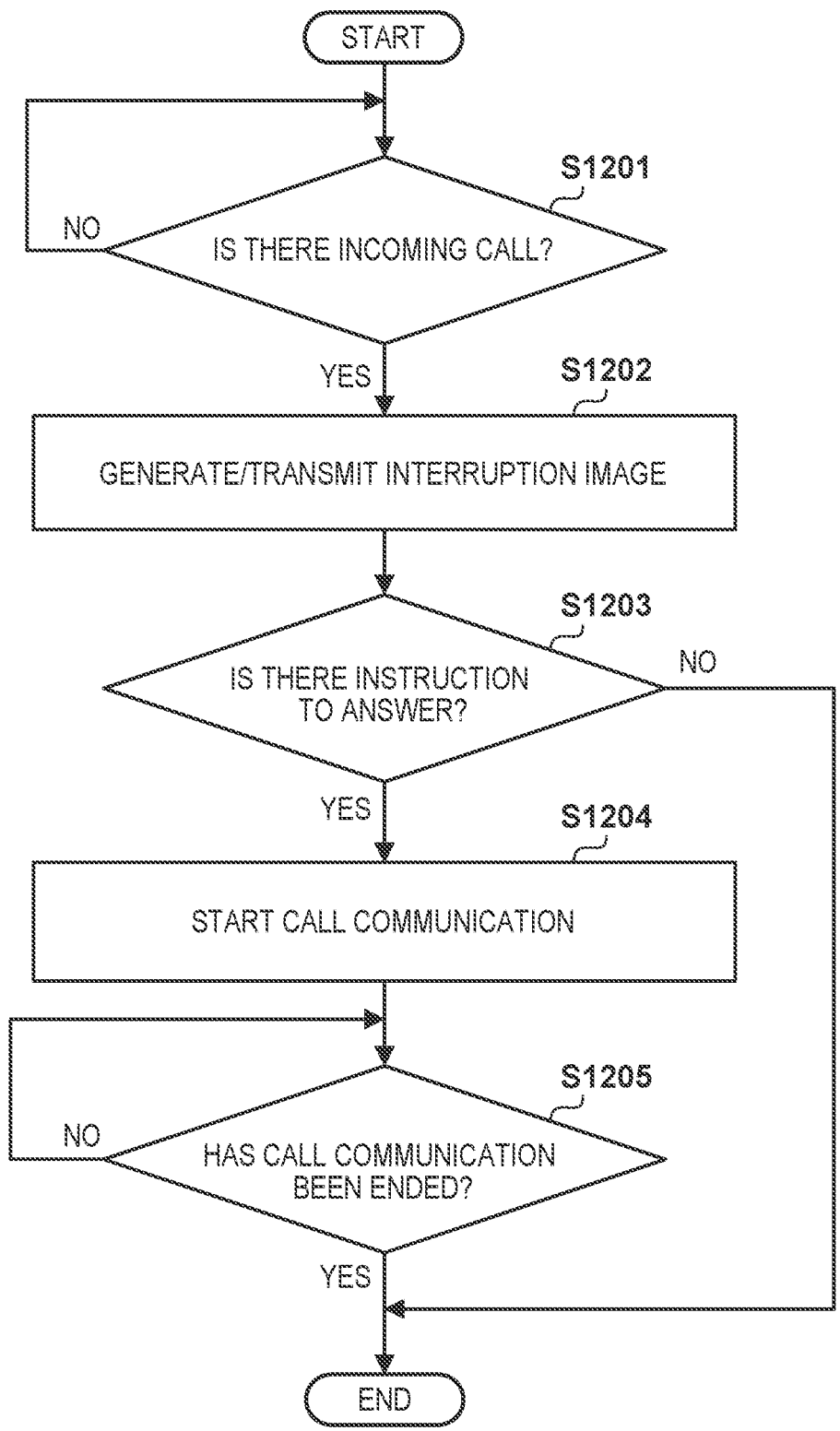
FIG. 12 is a diagram illustrating an operation of the mobile device in some embodiments.
Figure 13:
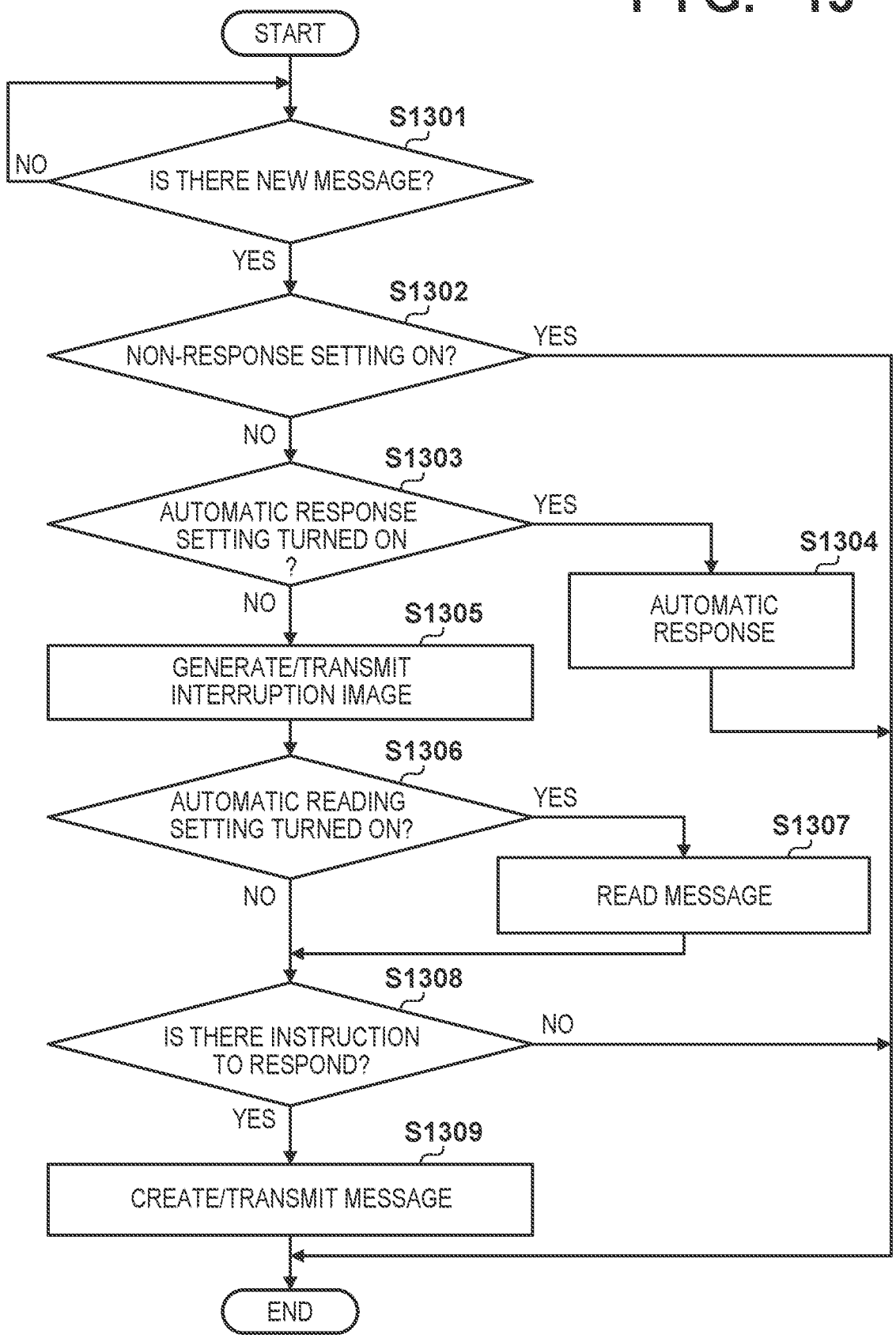
FIG. 13 is a diagram illustrating an operation of the mobile device in some embodiments.

The mobile device 310 transmits information indicating the cooperative function for requesting an interruption to the vehicle 100, instead of transmitting the interruption image in step S1202 of FIG. 12 and step S1305 of FIG. 13. The vehicle 100 determines whether the information indicating the cooperative function for requesting the interruption has been received, instead of determining whether the interruption image has been received in step S1501 of FIG. 15. The vehicle 100 lights on an indicator indicating a cooperative function for requesting an interruption, instead of displaying the cooperative image in step S1502 of FIG. 15. For example, when the call communication function requests an interruption, the vehicle 100 lights on an upper left indicator in the area 1601. At this point in time, while another cooperative function is being performed, the vehicle 100 maintains lighting on of the indicator indicating the cooperative function. The vehicle 100 may blink the indicator indicating the cooperative function for requesting the interruption, instead of lighting on. In a case of ending the cooperative function with of low priority when an interruption occurs (for example, the music reproducing function with respect to an interruption for the call communication function), the vehicle 100 lights off the indicator indicating the cooperative function that has been ended.

In the second embodiment, the mobile device 310 transmits the information indicating the cooperative function that is being selected and the cooperative function for requesting an interruption, instead of transmitting the cooperative image and the interruption image. Instead of this, the mobile device 310 may transmit the cooperative image and the interruption image, so that the vehicle 100 may determine which indicator should be lit on, based on the image. According to this configuration, regardless of the type of the display device 101 of the vehicle 100, the mobile device 310 is capable of performing the same operation.

In the above-described embodiments, the upward and downward inputs and the leftward and rightward inputs are exchangeable. For example, a leftward input may be used instead of an upward input, a rightward input may be used instead of a downward input, an upward input may be used instead of a leftward input, and a downward input may be used instead of a rightward input. In accordance with this, the position of the area 401 in the screen 400 may be changed. For example, the area 401 may be arranged on an upper side of the screen, in a case where the cooperation is started by a downward long press input and the cooperation is ended by an upward long press input. In addition, in the above-described embodiments, a leftward input and a rightward input are exchangeable. For example, a leftward input may be used instead of a rightward input, and a rightward input may be used instead of a leftward input. In accordance with this, the position of the area 401 in the screen 400 may be changed. For example, the area 401 may be arranged on a left side of the screen, in a case where the cooperation is started by a rightward long press input and the cooperation is ended by a leftward long press input.

SUMMARY OF EMBODIMENTS

<Item 1>

A mobile device (310) to be in cooperation with a vehicle (100), the mobile device comprising:
  processing means (311) for selecting and performing one of a plurality of cooperative functions;
  direction acquisition means (316) for acquiring upward, downward, leftward, and rightward instructions from the vehicle;
  generation means (311) for generating a sound output toward a driver of the vehicle; and
  voice acquisition means (316) for acquiring a voice input from the driver of the vehicle, wherein
  the processing means
  switches between the plurality of cooperative functions in a menu hierarchy based on an instruction in a first direction, the first direction being one of a horizontal direction and a vertical direction, and
  performs a process of a cooperative function that is being selected in a hierarchy other than the menu hierarchy, based on the upward, downward, leftward, and rightward instructions.

According to this item, the driver is able to intuitively operate a plurality of cooperative functions on the mobile device, by using the direction switch of the vehicle for upward, downward, leftward, and rightward.

<Item 2>

The mobile device according to Item 1, further comprising image providing means for providing the vehicle with an image to be displayed on the vehicle.

According to this item, the situation of the cooperative function of the mobile device can be recognized on the display device of the vehicle.

<Item 3>

The mobile device according to Item 1 or 2, wherein the processing means performs a process of the cooperative function that is being selected, further based on a voice input acquired by the voice acquisition means.

According to this item, the driver is able to input a complicated input by voice via the direction switch of the vehicle for upward, downward, leftward, and rightward.

<Item 4>

The mobile device according to any one of Items 1 to 3, wherein the plurality of cooperative functions are classified into the menu hierarchy, a target selection hierarchy for selecting a target to be performed by the cooperative function that is being selected, and an active hierarchy for indicating a performed situation of the cooperative function that is being selected.

According to this item, the driver is able to perform the cooperative function with a small number of operations.

<Item 5>

The mobile device according to Item 4, wherein the processing means transitions from the menu hierarchy to the target selection hierarchy and from the target selection hierarchy to the active hierarchy in the plurality of cooperative functions, based on an instruction in one specific direction of the upward, downward, leftward, and rightward instructions.

According to this item, the driver is able to transition between the hierarchies with a unified operational feel.

<Item 6>

The mobile device according to Item 5, wherein the processing means transitions from the active hierarchy to the target selection hierarchy and from the target selection hierarchy to the menu hierarchy, based on an instruction in a direction opposite to the specific direction.

According to this item, the driver is able to intuitively return the hierarchy.

<Item 7>

The mobile device according to Item 5 or 6, wherein the processing means transitions the process in an identical hierarchy, based on an instruction in a direction intersecting the specific direction.

According to this item, the driver is able to intuitively transition in the hierarchy.

\<Item 8\>

The mobile device according to any one of Items 5 to 7, wherein the processing means transitions to a voice search in the target selection hierarchy, based on an instruction in the specific direction.

According to this item, the driver is able to make a voice search with a unified operational feel.

\<Item 9\>

The mobile device according to any one of Items 5 to 8, wherein the processing means ceases to make a confirmation of the driver using an image, in transitioning from the target selection hierarchy to the active hierarchy.

According to this item, the amount of operations by the driver to perform the cooperative function can be reduced.

\<Item 10\>

The mobile device according to any one of Items 5 to 9, wherein the generation means changes a volume of the sound output, based on an instruction in a direction intersecting the specific direction.

According to this item, the volume can be changed in an intuitive method.

\<Item 11\>

The mobile device according to any one of Items 1 to 10, wherein the plurality of cooperative functions includes at least two of a call communication function, a weather information providing function, a messaging function, a music reproducing function, and a route guidance function.

According to this item, each function can be operated from the vehicle.

\<Item 12\>

A program for causing a computer to function as each means in the mobile device according to any one of Items 1 to 11.

According to this item, the above-described items are enabled in the form of a program.

\<Item 13\>

A control method for a mobile device (310) to be in cooperation with a vehicle (100), the control method comprising:

selecting and performing (S1103, S1107) one of a plurality of cooperative functions;

acquiring (S1102, S1104, S1106, S1108) upward, downward, leftward, and rightward instructions from the vehicle;

generating (S1103, S1107) a sound output toward a driver of the vehicle; and acquiring (S1107) a voice input from the driver of the vehicle, wherein the performing includes switching between the plurality of cooperative functions in a menu hierarchy based on an instruction in a first direction, the first direction being one of a horizontal direction and a vertical direction, and performing a process of a cooperative function that is being selected in a hierarchy other than the menu hierarchy, based on the upward, downward, leftward, and rightward instructions.

According to this item, the driver is able to intuitively operate a plurality of cooperative functions on the mobile device, by using the direction switch of the vehicle for upward, downward, leftward, and rightward.

\<Item 14\>

A vehicle (100) to be in cooperation with a mobile device (310), the vehicle comprising:

direction acquisition means (200) for acquiring upward, downward, leftward, and rightward instructions from a driver;

transmission means (306) for transmitting the upward, downward, leftward, and rightward instructions to the mobile device; and display means (304) for displaying, on a display device, a cooperative function that is being selected by the mobile device (101).

According to this item, the driver is able to intuitively operate a plurality of cooperative functions on the mobile device, by using the direction switch of the vehicle for upward, downward, leftward, and rightward.

\<Item 15\>

The vehicle according to Item 14, wherein the display device is a dot matrix type display device. According to this item, a specific situation of the cooperative function can be displayed.

\<Item 16\>

The vehicle according to Item 15, wherein the transmission means transmits an instruction to start cooperation to the mobile device, based on an instruction in one specific direction of the upward, downward, leftward, and rightward instructions, and the display means displays an image generated by a cooperative function in a direction opposite to the specific direction in the display device.

According to this item, the driver is able to intuitively start the cooperative function.

\<Item 17\>

The vehicle according to Item 16, wherein the transmission means transmits an instruction to end the cooperation to the mobile device, based on an instruction in the direction opposite to the specific direction.

According to this item, the driver is able to intuitively end the cooperative function.

\<Item 18\>

The vehicle according to Item 16 or 17, wherein the display means displays an image received as a response to a transmission of the upward, downward, leftward, and rightward instructions to the mobile device, in an animation of moving in the direction of the instruction.

According to this item, the driver is able to further intuitively grasp the input direction.

\<Item 19\>

The vehicle according to any one of Items 15 to 18, wherein the display means displays an image of a cooperative function started by a driver's input and an image of a cooperative function started by the mobile device in different areas of the display device.

According to this item, the driver is able to intuitively recognize that an interruption process has occurred.

\<Item 20\>

The vehicle according to Item 14, wherein the display device is an aggregation of indicators.

According to this item, the situation of the cooperative function can be displayed in a simple display.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A mobile device to be in cooperation with a vehicle, the mobile device comprising:

a processing unit configured to select and perform one of a plurality of cooperative functions;

a direction acquisition unit configured to acquire upward, downward, leftward, and rightward instructions from the vehicle;

a generation unit configured to generate a sound output toward a driver of the vehicle; and a voice acquisition unit configured to acquire a voice input from the driver of the vehicle, wherein the plurality of cooperative functions are classified into a menu hierarchy, a target selection hierarchy for selecting a target to be performed by the cooperative function that is being selected, and an active hierarchy for indicating a performed situation of the cooperative function that is being selected, and wherein the processing unit is configured to switch between the plurality of cooperative functions in the menu hierarchy based on an instruction in a first direction, the first direction being one of a horizontal direction and a vertical direction, perform a process of a cooperative function that is being selected in a hierarchy other than the menu hierarchy, only based on the upward, downward, leftward, and rightward instructions, transition from the menu hierarchy to the target selection hierarchy and from the target selection hierarchy to the active hierarchy in the plurality of cooperative functions, based on an instruction in one specific direction of the upward, downward, leftward, and rightward instructions, and transition to a voice search in the target selection hierarchy, based on an instruction in the specific direction.

2. The mobile device according to claim 1, further comprising an image providing unit configured to provide the vehicle with an image to be displayed on the vehicle.

3. The mobile device according to claim 1, wherein the processing unit is configured to perform a process of the cooperative function that is being selected, further based on a voice input acquired by the voice acquisition unit.

4. The mobile device according to claim 1, wherein the processing unit is configured to transition from the active hierarchy to the target selection hierarchy and from the target selection hierarchy to the menu hierarchy, based on an instruction in a direction opposite to the specific direction.

5. The mobile device according to claim 1, wherein the processing unit is configured to transition the process in an identical hierarchy, based on an instruction in a direction intersecting the specific direction.

6. The mobile device according to claim 1, wherein the processing unit is configured to cease to make a confirmation of the driver using an image, in transitioning from the target selection hierarchy to the active hierarchy.

7. The mobile device according to claim 1, wherein the generation unit is configured to change a volume of the sound output, based on an instruction in a direction intersecting the specific direction.

8. The mobile device according to claim 1, wherein the plurality of cooperative functions includes at least two of a call communication function, a weather information providing function, a messaging function, a music reproducing function, and a route guidance function.

9. A non-transitory storage medium storing a program for causing a computer to function as each unit in the mobile device according to claim 1.

10. A method for controlling a mobile device to be in cooperation with a vehicle, the method comprising:

selecting and performing one of a plurality of cooperative functions;

acquiring upward, downward, leftward, and rightward instructions from the vehicle;

generating a sound output toward a driver of the vehicle; and acquiring a voice input from the driver of the vehicle, wherein the plurality of cooperative functions are classified into a menu hierarchy, a target selection hierarchy for selecting a target to be performed by the cooperative function that is being selected, and an active hierarchy for indicating a performed situation of the cooperative function that is being selected, and wherein the performing includes switching between the plurality of cooperative functions in the menu hierarchy based on an instruction in a first direction, the first direction being one of a horizontal direction and a vertical direction, performing a process of a cooperative function that is being selected in a hierarchy other than the menu hierarchy, only based on the upward, downward, leftward, and rightward instructions, transitioning from the menu hierarchy to the target selection hierarchy and from the target selection hierarchy to the active hierarchy in the plurality of cooperative functions, based on an instruction in one specific direction of the upward, downward, leftward, and rightward instructions, and transitioning to a voice search in the target selection hierarchy, based on an instruction in the specific direction.

\* \* \* \* \*